United States Patent
Okamura et al.

(10) Patent No.: US 7,201,791 B2
(45) Date of Patent: Apr. 10, 2007

(54) INK JET LIGHT-COLOR INK, INK SET, INK JET RECORDING METHOD, INK CARTRIDGE, RECORDING UNIT, AND INK JET RECORDING APPARATUS

(75) Inventors: Daiji Okamura, Yokohama (JP); Yoshihisa Takizawa, Tokyo (JP); Shin-ichi Sato, Kawasaki (JP); Jun Yoshizawa, Tokyo (JP); Kunihiko Nakamura, Gotenba (JP); Yoshihide Aikawa, Yokohama (JP); Tomohiro Yamashita, Kawasaki (JP); Masanori Jinnou, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/339,640

(22) Filed: Jan. 26, 2006

(65) Prior Publication Data
US 2006/0119682 A1    Jun. 8, 2006

Related U.S. Application Data

(63) Continuation of application No. PCT/JP2005/014245, filed on Jul. 28, 2005.

(30) Foreign Application Priority Data

Jul. 29, 2004 (JP) .............. 2004-221832
Jul. 26, 2005 (JP) .............. 2005-216232

(51) Int. Cl.
*C09D 11/02* (2006.01)
*B41J 2/01* (2006.01)

(52) U.S. Cl. .............. 106/31.47; 106/31.49; 106/31.77; 106/31.78; 347/100

(58) Field of Classification Search .......... 106/31.47, 106/31.49, 31.77, 31.78; 347/100
See application file for complete search history.

(56) References Cited

U.S. PATENT DOCUMENTS

| | | | | |
|---|---|---|---|---|
| 5,123,960 | A | * | 6/1992 | Shirota et al. ........... 106/31.46 |
| 5,704,969 | A | * | 1/1998 | Kanaya et al. ........... 106/31.48 |
| 5,922,116 | A | * | 7/1999 | Mistry et al. ............ 106/31.47 |
| 6,460,987 | B1 | * | 10/2002 | Katsuragi et al. .......... 347/100 |
| 2005/0215773 | A1 | * | 9/2005 | Tateishi et al. ............. 534/653 |
| 2006/0102046 | A1 | * | 5/2006 | Okamura et al. ......... 106/31.47 |
| 2006/0102047 | A1 | * | 5/2006 | Yoshizawa et al. ....... 106/31.47 |
| 2006/0137570 | A1 | * | 6/2006 | Osumi et al. ............ 106/31.27 |
| 2006/0152569 | A1 | * | 7/2006 | Jinnou et al. ............... 347/105 |

FOREIGN PATENT DOCUMENTS

| | | |
|---|---|---|
| DE | 41 19 591 | 12/1992 |
| JP | 57-198758 | 12/1982 |
| JP | 61-87759 | 5/1986 |
| JP | 2004-323605 | 11/2004 |

OTHER PUBLICATIONS

English translation of JP 2004/323605, Nov. 2004.*

* cited by examiner

*Primary Examiner*—Helene Klemanski
(74) *Attorney, Agent, or Firm*—Fitzpatrick, Cella, Harper & Scinto

(57) ABSTRACT

There is provided an ink jet light-color ink which is excellent in color developability and is capable of achieving compatibility between environmental gas resistance and bronze resistance. The ink jet light-color ink to be used in combination with ink jet deep-color ink has a relatively large coloring material content, and comprises at least water, a water-soluble organic solvent, and a coloring material. The ink jet deep-color ink and the ink jet light-color ink satisfy specific conditions.

20 Claims, 9 Drawing Sheets

US 7,201,791 B2

INK JET LIGHT-COLOR INK, INK SET, INK JET RECORDING METHOD, INK CARTRIDGE, RECORDING UNIT, AND INK JET RECORDING APPARATUS

This application is a continuation of International Application No. PCT/JP2005/014245 filed on Jul. 28, 2005, which claims the benefit of Japanese Patent Application No. 2004-221832 filed on Jul. 29, 2004 and No. 2005-216232 filed on Jul. 26, 2005.

BACKGROUND OF THE INVENTION

1. Field of the Invention

The present invention relates to an ink jet ink which has high environmental gas resistance and provides good images in which the occurrence of metallic luster, the so-called bronze phenomenon, is suppressed even when the ink is printed on a recording medium. The present invention also relates to an ink jet recording method, ah ink cartridge, a recording unit, and an ink jet recording apparatus each using the ink jet ink.

2. Related Background Art

An ink jet recording method is a recording method of applying a small ink droplet to any one of recording media such as plain paper and glossy media to form an image, and has become rapidly widespread owing to a reduction in costs and improvement in recording rate. With the rapid spread of digital cameras in addition to improvement in the quality of images recorded by the method, the method has been generally used as a method of outputting photographic images comparable to silver halide photograph.

In recent years, image quality has undergone improvement more than ever owing to, for example, extreme reduction in size of an ink droplet and an improvement of the color gamut involved in the introduction of multi-color ink. Meanwhile, there have been growing demands for coloring materials and ink, and stricter properties have been required in respect of improvement of color developability and reliability concerning anti-clogging or ejection stability.

As compared with the silver halide photograph, the ink jet recording method is problematic in respect of, for example, the image storage stability of the resultant recorded article. In general, the recorded article obtained by the ink jet recording method is inferior in image storage stability to that by the silver halide photograph, and involves the emergence of a problem in that a coloring material on the recorded article is apt to deteriorate to cause a change in color tone of the image and the color fading of the image when the recorded article is exposed to light, humidity, heat, environmental gases present in the air, or the like for a long period of time. In particular, the enhancement of environmental gas resistance to the level of silver halide photograph has been of a concern from the past in the ink jet recording method. Cyan has the lowest environmental gas resistance among yellow, magenta, and cyan, which are hues used for ink jet ink. Therefore, the enhancement of the environmental gas resistance of cyan ink to the level comparable to that of yellow ink or magenta ink is of one important concern in the ink jet recording method.

The basic skeletons of coloring materials for ink jet ink having a cyan hue are roughly classified into a phthalocyanine skeleton and a triphenylmethane skeleton. Representative coloring materials of the former include C.I. Direct Blue 86 and 87, and C.I. Direct Blue 199. Representative coloring materials of the latter include C.I. Acid Blue 9.

In general, a phthalocyanine-based coloring material is characterized in that it is excellent in light resistance as compared to a triphenylmethane-based coloring material. Furthermore, the phthalocyanine-based coloring material has high fastness properties against humidity or heat and has good color developability, and so the coloring material has been widely used as a coloring material for ink jet ink.

However, the phthalocyanine-based coloring material tends to be poor in fastness against environmental gases in the air (such as ozone, $NO_x$, or $SO_2$), especially an ozone gas. In particular, in a recorded product obtained by applying the coloring material on a recording medium having an ink-receiving layer containing an inorganic substance such as alumina or silica, the fastness is significantly low, hence the color fading of the recorded article is left standing in a room for a long period of time. Various compounds to be added to ink have been disclosed for the purpose of improving the environmental gas resistance (see, for example, Japanese Patent Application Laid-Open No. H05-171085, Japanese Patent Application Laid-Open No. H11-29729, Japanese Patent Application Laid-Open No. H10-130517, Japanese Patent Application Laid-Open No. 2000-303009, and Japanese Patent Application Laid-Open No. 2002-249677). However, none of those publications has achieved compatibility between good color developability and high environmental gas resistance for ink jet ink.

The phthalocyanine-based coloring material involves another problem, that is, the occurrence of metallic luster resulting from the high aggregation properties of the coloring material, the so-called bronze phenomenon. When the bronze phenomenon occurs in a recorded article, the optical reflection properties of the recorded article change. As a result, the color developability and hue of an image remarkably change, with the result that the image quality is significantly lowered. The bronze phenomenon is considered to occur as a result of the aggregation of the coloring material on the surface of a recording medium due to, for example, the high aggregation properties of the coloring material in ink and a lowering in permeability of the ink into the recording medium when the ink is applied to the recording medium. In particular, a coloring material with an amino group introduced in its molecule for the purpose of improving environmental gas resistance, or an ink containing a coloring material having low solubility in water tends to significantly cause the bronze phenomenon.

For example, it has been proposed that a specific phthalocyanine-based coloring material is used to improve the environmental gas resistance (see, for example, Japanese Patent No. 2942319). The use of the specific phthalocyanine-based coloring material provides the environmental gas resistance which is of one concern in the phthalocyanine-based coloring material. However, in the proposition, there is no reference to the bronze phenomenon, and hence, resistance to the bronze phenomenon of the coloring material is unclear. In other words, the compatibility between resistance to bronze phenomenon (bronze resistance) and environmental gas resistance has not yet been achieved.

Therefore, it is indispensable to conduct research on ink jet ink using a phthalocyanine-based coloring material which is excellent in color developability, has high environmental gas resistance, and suppresses the occurrence of the bronze phenomenon.

SUMMARY OF THE INVENTION

In particular, in recent years, in order to obtain a high-quality recorded article comparable to silver halide photograph, multiple inks having the same color tone and different coloring material concentrations have often been used in combination to form an image. To be specific, ink having a relatively large coloring material content (so-called deep-color ink) and ink having a relatively small coloring material content (so-called light-color ink) are used in combination to form an image. The combined use allows an image with reduced granularity at a light-color color portion and excellent in tone reproduction to be formed.

However, an image formed by means of light-color ink generally tends to be inferior in environmental gas resistance to an image formed by means of deep-color ink. In actuality, there arises a problem in that an image printed by means of conventional light-color ink is apparently inferior in environmental gas resistance to silver halide photograph. Accordingly, in an ink system using deep-color ink and light-color ink in combination, a coloring material for the light-color ink must be superior in environmental gas resistance to a coloring material for the deep-color ink.

In particular, one possible approach to solving the problem is to increase the aggregation properties of a coloring material having a phthalocyanine skeleton in light-color ink to enhance the environmental gas resistance of the ink. Although bronze phenomenon generally tends to be more likely to occur as a coloring material concentration increases, no bronze phenomenon has occurred at the coloring material concentration of conventional light-color ink. However, it has been found that an increase in aggregation properties of a coloring material causes bronze phenomenon to occur even in light-color ink having a coloring material content (mass %) of 0.5 mass % or more and less than 3.0 mass % with respect to the total mass of the ink.

The inventors of the present invention have made extensive studies to find that the aggregation properties of a coloring material can be adequately controlled even in light-color ink having a coloring material content (mass %) of 0.5 mass % or more and less than 3.0 mass % with respect to the total mass of the light-color ink by changing a kind of substituent of a compound represented by a general formula (I) or a salt thereof. The inventors have found that the adequate control provides good color developability, suppresses the occurrence of bronze phenomenon, and provides excellent environmental gas resistance.

When an image is to be formed on a recording medium by means of an ink jet recording apparatus equipped with deep-color ink and light-color ink, a high gradation is represented by applying a larger amount of the light-color ink than that of the deep-color ink at a light-color color portion of the image and applying a larger amount of the deep-color ink than that of the light-color ink at a deep-color color portion of the image.

The studies made by the inventors of the present invention have found that since a large amount of each of deep-color ink and light-color ink is applied around an intermediate portion in the gradation region of an image, the aggregation properties of a coloring material increases on a recording medium, so bronze phenomenon tends to be likely to occur.

Furthermore, as described above, an image formed by means of light-color ink generally tends to be inferior in environmental gas resistance to an image formed by means of deep-color ink, so higher aggregation properties must be imparted to a coloring material of the light-color ink than that of a coloring material of the deep-color ink. At this time, in order to suppress the occurrence of bronze phenomenon over the entire gradation region, the deep-color ink is requested to have appropriate aggregation properties with which bronze phenomenon can be suppressed even when a letter is printed by means of the deep-color ink in combination with light-color ink containing a coloring material having high aggregation properties and to have high fastness.

The inventors of the present invention have made extensive studies to find that the aggregation properties of a coloring material can be adequately controlled even in deep-color ink, which has a coloring material content (mass %) set to be at least 3.0 mass % or more with respect to the total mass of the deep-color ink to maintain color developability comparable to that of conventional ink jet cyan ink, by changing a kind of substituent of a compound represented by the general formula (I) or a salt thereof. The inventors have found that the adequate control suppresses the occurrence of bronze phenomenon and provides excellent environmental gas resistance even when printing is performed by using deep-color ink having a coloring material concentration of 3.0 mass % or more and light-color ink in combination.

The foregoing involves the emergence of a problem in that extremely high environmental gas resistance must be imparted to light-color ink to be used in combination with deep-color ink excellent in environmental gas resistance, but the impartment is apt to cause bronze phenomenon. In other words, light-color ink which is excellent in environmental gas resistance and causes no bronze phenomenon even when it is used in combination with deep-color ink having good environmental gas resistance is needed.

Therefore, an object of the present invention is to provide an ink jet light-color ink which is excellent in color developability and is capable of achieving compatibility between environmental gas resistance and bronze resistance.

Another object of the present invention is to provide an ink set, an ink jet recording method, an ink cartridge, a recording unit, and an ink jet recording apparatus each using the ink jet light-color ink.

The above objects are achieved by the present invention described below. That is, according to one aspect of the present invention, there is provided an ink jet light-color ink to be used in combination with ink jet deep-color ink having a relatively large coloring material content, the ink jet light-color ink comprising at least water, a water-soluble organic solvent and a coloring material, characterized in that the ink jet deep-color ink satisfies the following conditions (1) and (2); and the ink jet light-color ink satisfies the following conditions (3) to (5);

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

(2) In a dispersion distance distribution, measured by a small-angle X-ray scattering method, of molecular aggregates in the deep-color ink whose coloring material concentration is adjusted to 3.0 mass %, a dispersion distance $d_{75}$ value corresponding to 75% of the distribution is 6.50 nm or more and 7.10 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) In a dispersion distance distribution, measured by a small-angle X-ray scattering method, of molecular aggregates in the light-color ink whose coloring material concentration is adjusted to 0.5 mass %, a dispersion distance $d_{75}$ value corresponding to 75% of the distribution is 6.70 nm or more and 10.60 nm or less;

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

General formula (I):

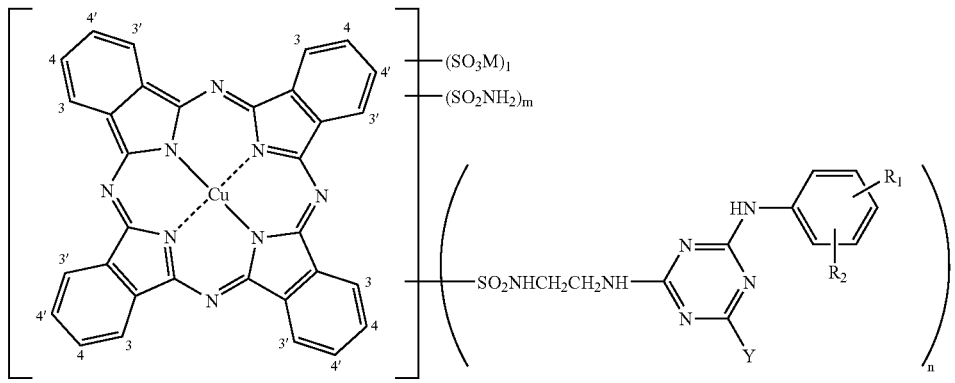

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituents are present are 4- or 4'-positions.

According to another aspect of the present invention, there is provided an ink jet light-color ink to be used in combination with ink jet deep-color ink having a relatively large coloring material content, the ink jet light-color ink comprising at least water, a water-soluble organic solvent and a coloring material, characterized in that the ink jet deep-color ink satisfies the following conditions (1) and (2); and the ink jet light-color ink satisfies the following conditions (3) to (5);

(2) A maximum absorption wavelength (λmax) obtained by measuring an absorbance of deep-color ink prepared by diluting 2,000 times the ink jet deep-color ink is 612.0 nm or more and 616.0 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) A maximum absorption wavelength (λmax) obtained by measuring an absorbance of light-color ink prepared by diluting 2,000 times the ink jet light-color ink is 608.0 nm or more and 613.0 nm or less;

General formula (I):

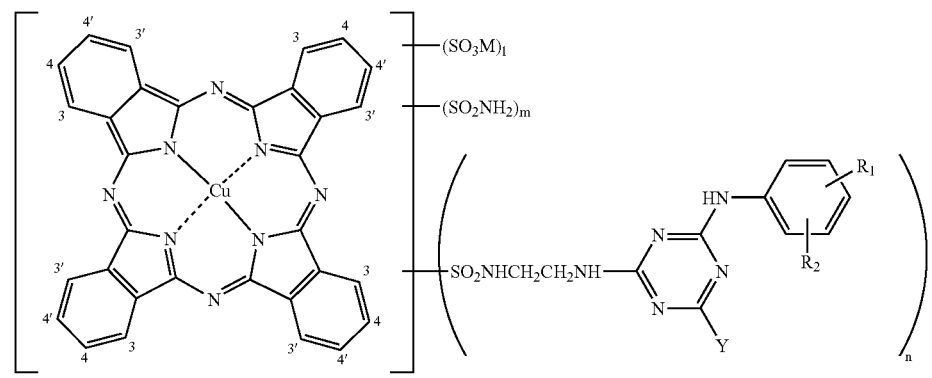

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; 1 represents 0 to 2, m represents 1 to 3, and n represents 1 to 3 (provided that 1+m+n=3 to 4); and positions at which substituents are present are 4- or 4'-positions.

According to another aspect of the present invention, there is provided an ink jet light-color ink to be used in combination with ink jet deep-color ink having a relatively large coloring material content, the ink jet light-color ink comprising at least water, a water-soluble organic solvent and a coloring material, characterized in that the ink jet deep-color ink satisfies the following conditions (1) and (2); and the ink jet light-color ink satisfies the following conditions (3) to (5);

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

(2) A maximum absorption wavelength (λmax) obtained by measuring an absorbance of deep-color ink prepared by diluting 2,000 times the ink jet deep-color ink is 612.0 nm or more and 614.0 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) A maximum absorption wavelength (λmax) obtained by measuring an absorbance of light-color ink prepared by diluting 2,000 times the ink jet light-color ink is 608.0 nm or more and 613.0 nm or less;

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atoms); Y represents a chlorine atom, a hydroxyl group, an amino group, or a monoalkylamino or dialkylamino group; 1 represents 0 to 2, m represents 1 to 3, and n represents 1 to 3 (provided that 1+m+n=3 to 4); and positions at which substituents are present are 4- or 4'-positions.

According to another aspect of the present invention, there is provided an ink jet light-color ink to be used in combination with ink jet deep-color ink having a relatively large coloring material content, the ink jet light-color ink comprising at least water, a water-soluble organic solvent and a coloring material, characterized in that the ink jet deep-color ink satisfies the following conditions (1) to (3); and the ink jet light-color ink satisfies the following conditions (4) to (6);

(Conditions)

(1) The ink jet deep-color ink comprises at least water, a water-soluble organic solvent, and a compound represented by the following general formula (I) or a salt thereof as a coloring material, and a content (mass %) of the coloring material is 3.0 mass % or more with respect to a total mass of the ink jet deep-color ink;

(2) A content (mass %) of 2-pyrrolidone in the water-soluble organic solvent is 50.0% or more with respect to the content (mass %) of the coloring material;

(3) A maximum absorption wavelength (λmax) obtained by measuring an absorbance of deep-color ink prepared by diluting 2,000 times the ink jet deep-color ink is 612.0 nm or more and 616.0 nm or less;

(4) The coloring material comprises a compound represented by the following general formula (I) or a salt thereof, and a content (mass %) of the coloring material is 0.5 mass % or more and less than 3.0 mass % with respect to a total mass of the ink jet light-color ink;

(5) A content (mass %) of 2-pyrrolidone in the water-soluble organic solvent is 50.0% or more with respect to the content (mass %) of the coloring material;

(6) A maximum absorption wavelength (λmax) obtained by measuring an absorbance of light-color ink prepared by diluting 2,000 times the ink jet light-color ink is 608.0 nm or more and 613.0 nm or less;

General formula (I):

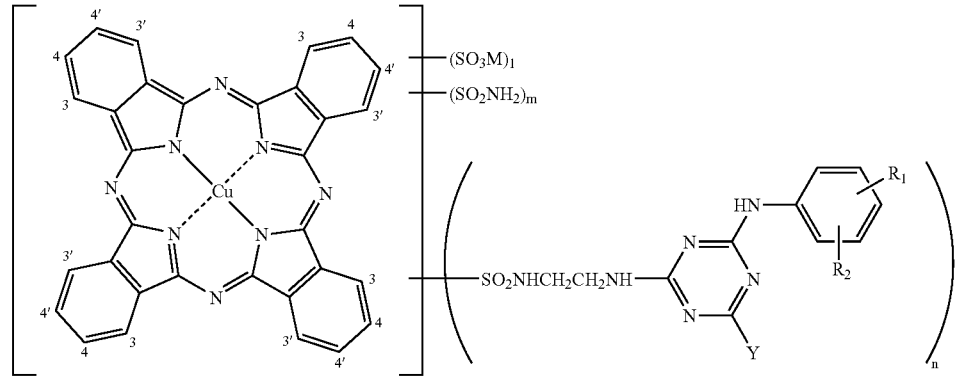

General formula (I):

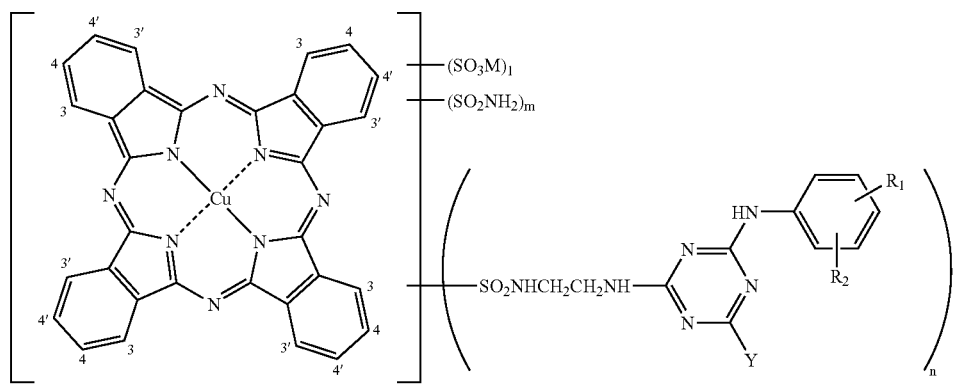

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which substituents are present are 4- or 4'-positions.

According to another aspect of the present invention, there is provided an ink set including multiple inks, characterized by including the above-described ink jet light-color ink and the above-described ink jet deep-color ink.

According to another aspect of the present invention, an ink jet recording method is provided including ejecting an ink by an ink jet method to perform recording on a recording medium, wherein the ink is the above-described ink jet light-color ink.

According to another aspect of the present invention, an ink cartridge is provided including an ink storage portion for storing an ink, wherein the ink is the above-described ink jet light-color ink.

According to another aspect of the present invention, a recording unit is provided including an ink storage portion for storing ink and a recording head for ejecting the ink, wherein the ink is the above-described ink jet light-color ink.

According to another aspect of the present invention, an ink jet recording apparatus is provided including an ink storage portion for storing ink and a recording head for ejecting the ink, wherein the ink is the above-described ink jet light-color ink.

According to the present invention, there can be provided an ink jet light-color ink which is excellent in color developability and is capable of achieving compatibility between environmental gas resistance and bronze resistance.

According to the present invention, there can be provided an ink set, an ink jet recording method, an ink cartridge, a recording unit, and an ink jet recording apparatus each using the ink jet light-color ink.

DESCRIPTION OF THE PREFERRED EMBODIMENTS

Figure 1:
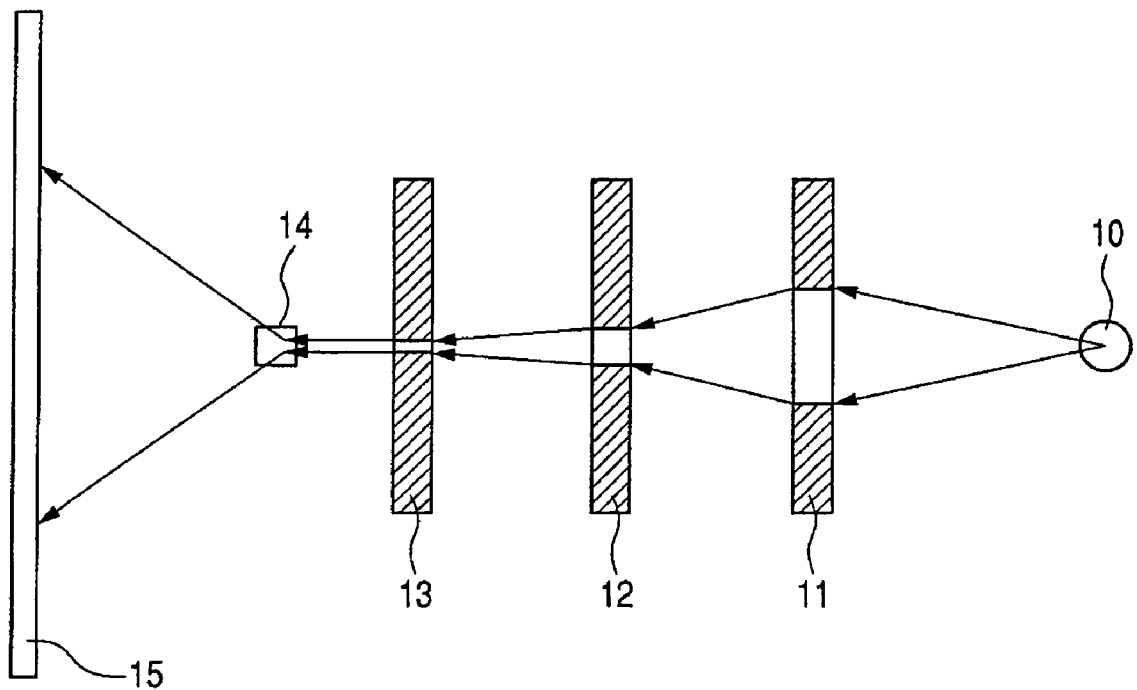
FIG. 1 is a view showing the measurement principle of small-angle X-ray scattering method.

Hereinafter, the present invention will be described in more detail by way of preferred embodiments.

In the present invention, when a coloring material is a salt, the salt is dissociated into ions in ink, but this state is represented by using the phrase "contains a salt" for convenience.

In the present invention, the content (mass %) of a coloring material in light-color ink is 0.5 mass % or more and less than 3.0 mass % with respect to the total mass of the ink, and the content (mass %) of a coloring material in deep-color ink is 3.0 mass % or more with respect to the total mass of the ink.

<Ink>

Hereinafter, components constituting the ink jet ink according to the present invention (hereinafter also referred to as simply the ink) and the like will be described in detail.

Among yellow ink, magenta ink and cyan ink each of which is widely used as ink jet ink, particularly the cyan ink tends to be poor in environmental gas resistance. To cope with the problem of the environmental gas resistance in cyan ink, the present invention aims at providing cyan ink, especially light-color cyan ink in which, when a recorded article obtained by means of the cyan ink is exposed in an environment having a temperature of 40° C., a humidity of 55%, and an ozone gas concentration of 2 ppm for 20 hours, the reflection density at a 50% duty portion of the recorded article is 83% or more of the reflection density at the 50% duty portion of the recorded article before the exposure. A recorded article obtained by means of yellow ink and magenta ink each of which is excellent in environmental gas resistance has excellent environmental gas resistance with which 83% or more of the reflection density remains under the above exposure conditions. Therefore, the use of each of: light-color cyan ink in which 83% or more of the reflection density remains under the above exposure conditions; and an ink set including the cyan ink, in combination with yellow ink and magenta ink each of which is excellent in environmental gas resistance, achieves excellent image storage stability.

(Coloring Material)

The ink according to the present invention must contain a compound represented by the following general formula (I) or a salt thereof. The compound represented by the following general formula (I) or the salt thereof is a phthalocyanine derivative characterized in that it has a cyan hue and is excellent in environmental gas resistance.

The coloring material used in the present invention is a phthalocyanine derivative obtained by selectively introducing a sulfonic group, an unsubstituted sulfamoyl group ($-SO_2NH_2$), or a substituted sulfamoyl group (a group represented by the general formula (IV)) to only at each of 4-positions and 4'-positions in the general formula (I) ($R_2$, General formula (I)

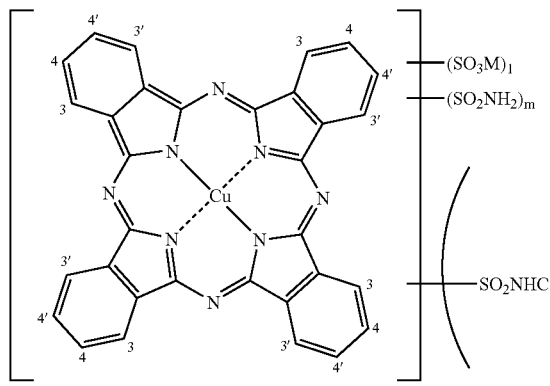
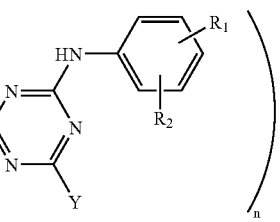

(In the general formula (I) M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which the substituents are present are the 4- or 4'-positions.)

In general, when a phthalocyanine derivative is synthesized, it often inevitably includes substitution position isomers which are different in positions at which substituents $R_n$ (n: 1 to 16) in the general formula (III) (positions of carbon atoms on the benzene rings to which $R_1$ to $R_{16}$ are bonded are defined as 1 position to 16 position, respectively) are present. However, in general, the substitution position isomers are not distinguished from one another, and are often regarded as the same derivative.

$R_3$, $R_6$, $R_7$, $R_{10}$, $R_{11}$, $R_{14}$, and $R_{15}$ in the general formula (III)) and setting the number of substituents to 3 to 4. The inventors of the present invention have found that a recorded article obtained by means of ink containing such compound is extremely excellent in environmental gas resistance.

The compound represented by the general formula (I) or the salt thereof used in the present invention is synthesized by using, as a raw material, a phthalocyanine compound obtained by reacting a 4-sulfophthalic acid derivative, or a 4-sulfophthalic acid derivative and a phthalic (anhydride) derivative, in the presence of a metal compound. The compound or the salt thereof is obtained by converting a sulfonic group in the phthalocyanine compound into a chlorosulfonic group which is then allowed to react with an aminating agent in the presence of an organic amine.

General formula (III)

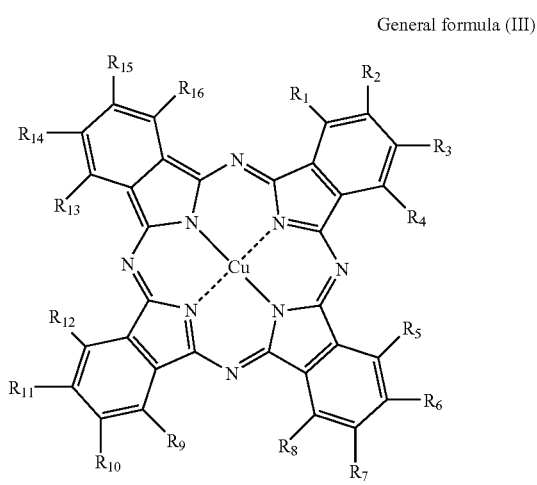

General formula (IV)

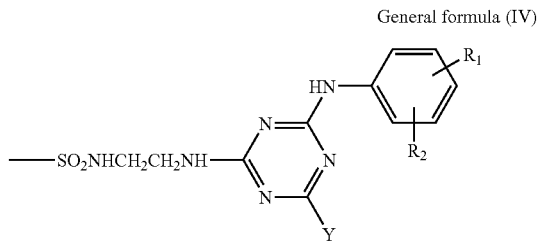

Preferable examples of the substituted sulfamoyl group represented by the general formula (IV) are shown below. The substituted sulfamoyl group used in the present invention is not limited to them. The substituted sulfamoyl group represented by the general formula (IV) is shown in the form of a free acid.

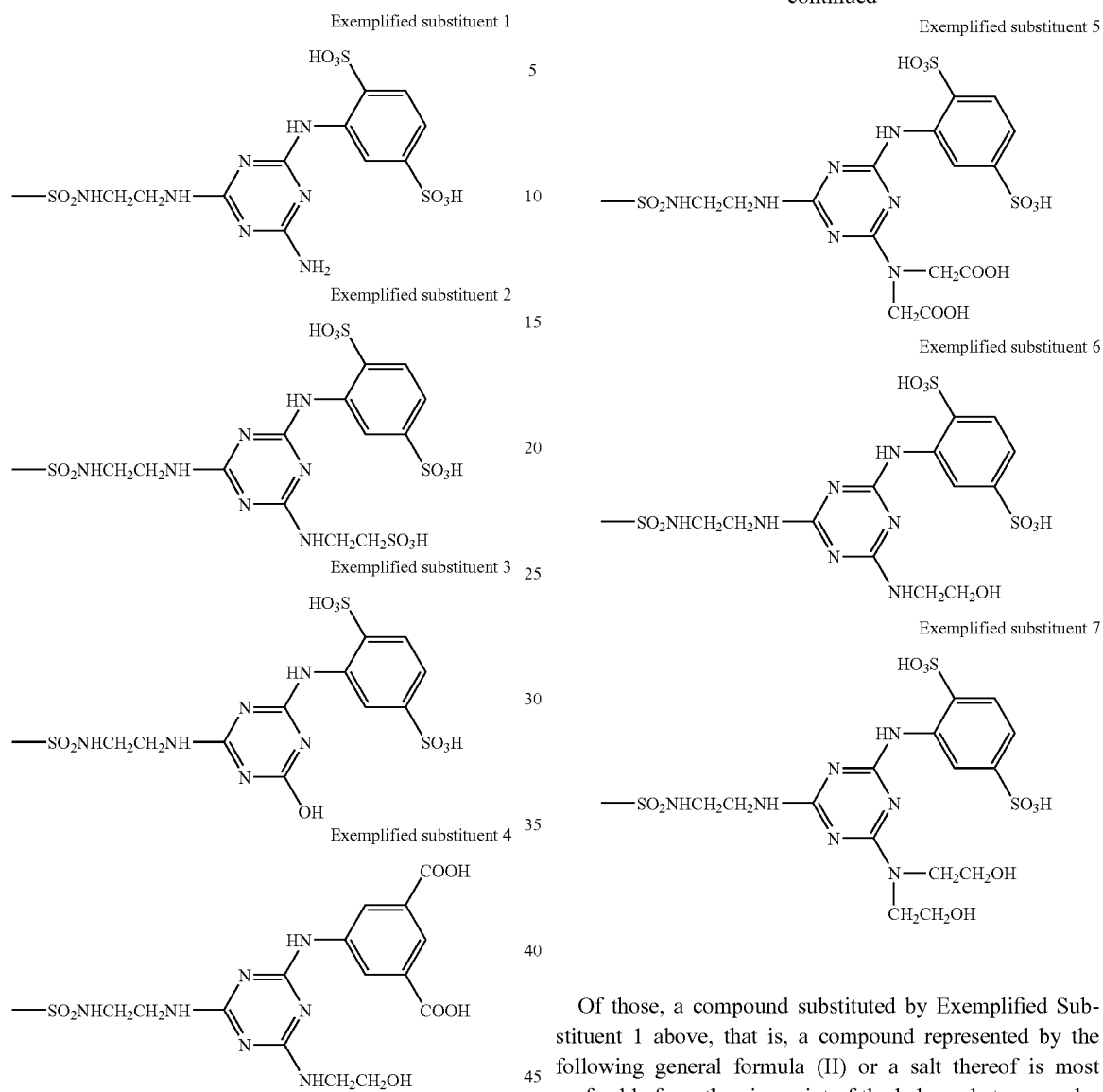
Of those, a compound substituted by Exemplified Substituent 1 above, that is, a compound represented by the following general formula (II) or a salt thereof is most preferable from the viewpoint of the balance between color developability and environmental gas resistance.
General formula (II)
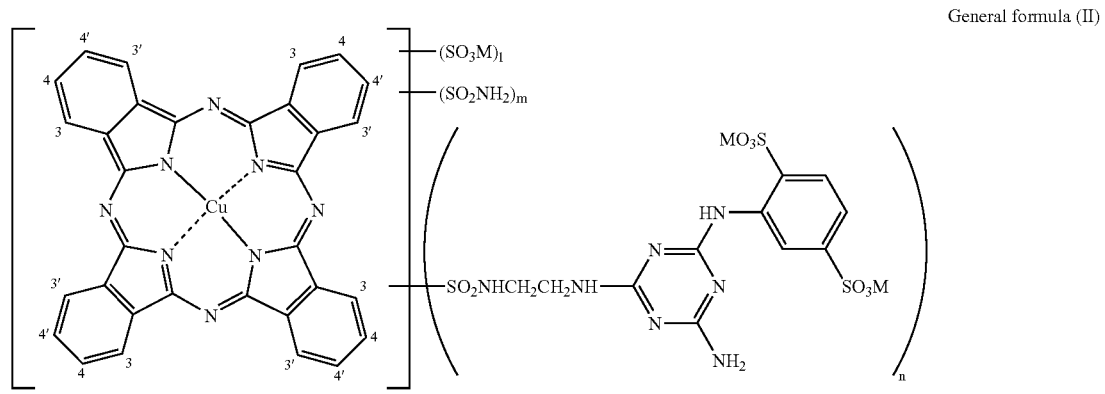

(In the general formula (II), M represents an alkali metal or ammonium; l represents 0 to 2, m represents 1 to 3, and n represents 1 to 3 (provided that l+m+n=3 to 4); and positions at which the substituents are present are the 4- or 4'-positions.)

However, even in such a compound as represented by the general formula (I) used in the present invention in which the number of substituents is 3 to 4, that is, l+m+n=3 to 4 and the substitution position is limited to 4- or 4'-positions, a large number of isomers are present as shown in Tables 1 and 2 below, which are different from each other in the number of each of a sulfonic group (—$SO_3M$), an unsubstituted sulfamoyl group (—$SO_2NH_2$), and a substituted sulfamoyl group (a group represented by the general formula (IV)), each of which is a substituent with which the phthalocyanine skeleton is substituted. The compound represented by the general formula (I) or the salt thereof is a mixture of those isomers, and it has been confirmed that even compounds having the same structure are greatly different in their properties depending on the number and kinds of isomers. A difference in aggregation properties between coloring materials may be cited as one example of the properties.

TABLE 1

The number of substituents, the positions of substituents, and the kinds of isomers (for l + m + n = 4)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| l, m, n = 0, 1, 3 | 0 | 0 | 1 | 0 | 3 | 0 |
| | 0 | 0 | 1 | 0 | 2 | 1 |
| | 0 | 0 | 1 | 0 | 1 | 2 |
| | 0 | 0 | 1 | 0 | 0 | 3 |
| | 0 | 0 | 0 | 1 | 3 | 0 |
| | 0 | 0 | 0 | 1 | 2 | 1 |
| | 0 | 0 | 0 | 1 | 1 | 2 |
| | 0 | 0 | 0 | 1 | 0 | 3 |
| l, m, n = 0, 2, 2 | 0 | 0 | 2 | 0 | 2 | 0 |
| | 0 | 0 | 2 | 0 | 1 | 1 |
| | 0 | 0 | 2 | 0 | 0 | 2 |
| | 0 | 0 | 1 | 1 | 2 | 0 |
| | 0 | 0 | 1 | 1 | 1 | 1 |
| | 0 | 0 | 1 | 1 | 0 | 2 |
| | 0 | 0 | 0 | 2 | 2 | 0 |
| | 0 | 0 | 0 | 2 | 1 | 1 |
| | 0 | 0 | 0 | 2 | 0 | 2 |
| l, m, n = 0, 3, 1 | 0 | 0 | 3 | 0 | 1 | 0 |
| | 0 | 0 | 3 | 0 | 0 | 1 |
| | 0 | 0 | 2 | 1 | 1 | 0 |
| | 0 | 0 | 2 | 1 | 0 | 1 |
| | 0 | 0 | 1 | 2 | 0 | 1 |
| | 0 | 0 | 1 | 2 | 1 | 0 |
| | 0 | 0 | 0 | 3 | 0 | 1 |
| | 0 | 0 | 0 | 3 | 1 | 0 |
| l, m, n = 1, 1, 2 | 1 | 0 | 1 | 0 | 2 | 0 |
| | 1 | 0 | 1 | 0 | 1 | 1 |
| | 1 | 0 | 1 | 0 | 0 | 2 |
| | 1 | 0 | 0 | 1 | 2 | 0 |
| | 1 | 0 | 0 | 1 | 1 | 1 |
| | 1 | 0 | 0 | 1 | 0 | 2 |
| | 0 | 1 | 1 | 0 | 2 | 0 |
| | 0 | 1 | 1 | 0 | 1 | 1 |
| | 0 | 1 | 1 | 0 | 0 | 2 |
| | 0 | 1 | 0 | 1 | 2 | 0 |
| | 0 | 1 | 0 | 1 | 1 | 1 |
| | 0 | 1 | 0 | 1 | 0 | 2 |
| l, m, n = 1, 2, 1 | 1 | 0 | 2 | 0 | 1 | 0 |
| | 1 | 0 | 2 | 0 | 0 | 1 |
| | 1 | 0 | 1 | 1 | 1 | 0 |
| | 1 | 0 | 1 | 1 | 0 | 1 |
| | 1 | 0 | 0 | 2 | 1 | 0 |
| | 1 | 0 | 0 | 2 | 0 | 1 |
| | 0 | 1 | 2 | 0 | 1 | 0 |
| | 0 | 1 | 2 | 0 | 0 | 1 |
| | 0 | 1 | 1 | 1 | 1 | 0 |
| | 0 | 1 | 1 | 1 | 0 | 1 |
| | 0 | 1 | 0 | 2 | 1 | 0 |
| | 0 | 1 | 0 | 2 | 0 | 1 |
| l, m, n = 2, 1, 1 | 2 | 0 | 1 | 0 | 1 | 0 |
| | 2 | 0 | 1 | 0 | 0 | 1 |
| | 2 | 0 | 0 | 1 | 1 | 0 |
| | 2 | 0 | 0 | 1 | 0 | 1 |
| | 1 | 1 | 1 | 0 | 1 | 0 |
| | 1 | 1 | 1 | 0 | 0 | 1 |
| | 1 | 1 | 0 | 1 | 1 | 0 |
| | 1 | 1 | 0 | 1 | 0 | 1 |
| | 0 | 2 | 1 | 0 | 1 | 0 |
| | 0 | 2 | 1 | 0 | 0 | 1 |
| | 0 | 2 | 0 | 1 | 1 | 0 |
| | 0 | 2 | 0 | 1 | 0 | 1 |

TABLE 2

The number of substituents, the positions of substituents, and the kinds of isomers (for l + m + n = 3)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| l, m, n = 0, 1, 2 | 0 | 0 | 1 | 0 | 2 | 0 |
| | 0 | 0 | 1 | 0 | 1 | 1 |
| | 0 | 0 | 1 | 0 | 0 | 2 |
| | 0 | 0 | 0 | 1 | 2 | 0 |
| | 0 | 0 | 0 | 1 | 1 | 1 |
| | 0 | 0 | 0 | 1 | 0 | 2 |
| l, m, n = 0, 2, 1 | 0 | 0 | 2 | 0 | 1 | 0 |
| | 0 | 0 | 2 | 0 | 0 | 1 |
| | 0 | 0 | 1 | 1 | 1 | 0 |
| | 0 | 0 | 1 | 1 | 0 | 1 |
| | 0 | 0 | 0 | 2 | 1 | 0 |
| | 0 | 0 | 0 | 2 | 0 | 1 |
| l, m, n = 1, 1, 1 | 1 | 0 | 1 | 0 | 1 | 0 |
| | 1 | 0 | 1 | 0 | 0 | 1 |
| | 1 | 0 | 0 | 1 | 1 | 0 |
| | 1 | 0 | 0 | 1 | 0 | 1 |
| | 0 | 1 | 1 | 0 | 1 | 0 |
| | 0 | 1 | 1 | 0 | 0 | 1 |
| | 0 | 1 | 0 | 1 | 1 | 0 |
| | 0 | 1 | 0 | 1 | 0 | 1 |

In general, a phthalocyanine-based coloring material has higher aggregation properties than that of coloring materials having other structures (for example, a triphenylmethane-based, azo-based, or xanthene-based coloring material). The enhancement of the aggregation properties elevates fastness. Meanwhile, coloring material having high aggregation properties shows high aggregation properties also in ink. Therefore, when an image is printed on a recording medium by using such coloring materials, the bronze phenomenon tends to remarkably occur to lower image quality.

In contrast, when a coloring material has significantly low aggregation properties, the fastness properties (especially environmental gas resistance) of the coloring material deteriorate. Therefore, the recorded article obtained by using an ink containing such a coloring material may be unable to obtain image storage stability at the same level as yellow ink and magenta ink which are excellent in environmental gas resistance.

Accordingly, when the compound represented by the general formula (I) or the salt thereof is used as a coloring material, the aggregation properties of the coloring material must be controlled in such a manner that the occurrence of the bronze phenomenon can be suppressed and desired environmental gas resistance can be obtained.

[Measurement of Aggregation Properties of Coloring Material]

A small-angle X-ray scattering method is applicable to the measurement of the aggregation properties of a coloring material used in the present invention.

As described in, for example, "Saishin Colloid Kagaku" (Latest Colloid Chemistry) (Kodansha Scientific, Fumio Kitahara and Kunio Furusawa) and "Hyomen Jotai and Colloid Jotai" (Surface State and Colloid State) (Tokyo Kagaku Dozin, Co., Ltd., Masayuki Nakagaki), the small-angle X-ray scattering method is an approach that has been generally used for calculating a distance between colloid particles in a colloidal solution.

The outline of a small-angle X-ray scattering apparatus will be described with reference to FIG. 1 showing the measurement principle of the small-angle X-ray scattering method. The focal spot size of each of X-rays generated from an X-ray source 10 is reduced to about several millimeters during the passing of the X-rays through a first slit 11, a second slit 12, and a third slit 13, and then a sample solution 14 is irradiated with the X-rays. The X-rays with which the sample solution 14 is irradiated are scattered by particles in the sample solution before the X-rays are detected on an imaging plate 15. Since the scattered X-rays interfere with each other because of an optical path difference between them, a distance d value between particles can be determined on the basis of Bragg equation (the following expression (1)) by means of the resultant θ value. The d value to be determined here is considered to be a distance from the center of a particle to the center of an adjacent particle, the particles being arranged at a constant interval.

$$d = \lambda/2 \sin \theta \qquad \text{Eq. (1)}$$

(In the expression (1), λ represents the wavelength of an X-ray, d represents the distance between particles, and θ represents a scattering angle.)

Figure 2:
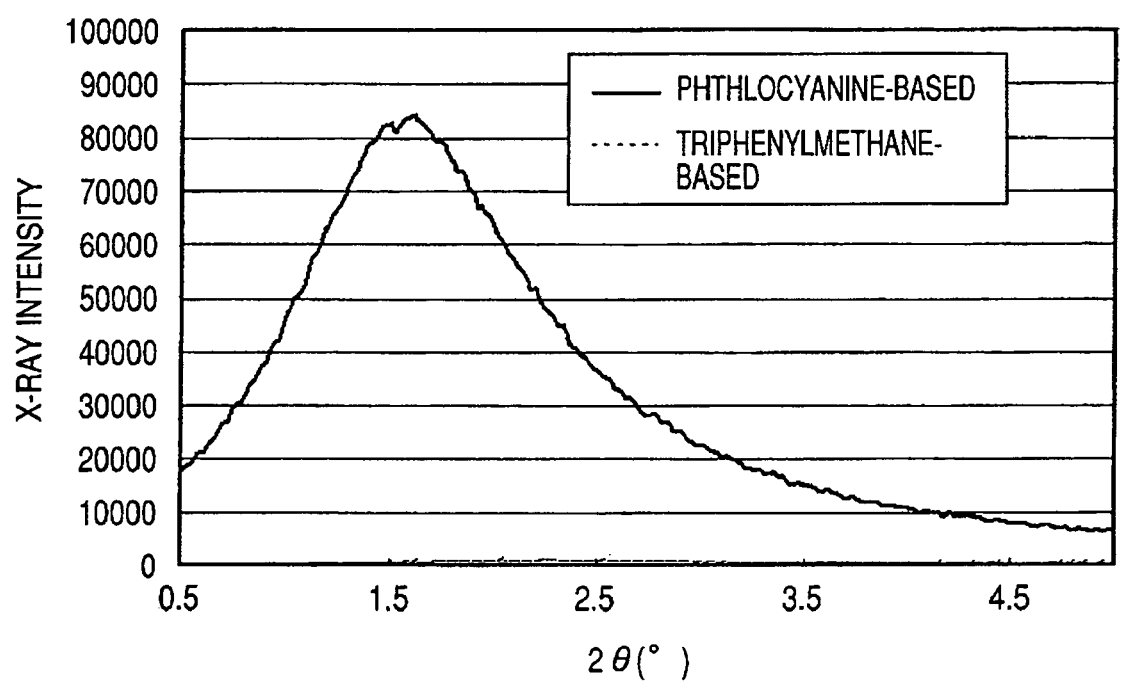
FIG. 2 is a small-angle X-ray scattering profile of each of a phthalocyanine-based coloring material and a triphenylmethane-based coloring material.

In general, no peak occurs in a scattering angle profile when particles in a solution are not regularly arranged. In the case of an aqueous solution of the coloring material (phthalocyanine-based coloring material) used in the present invention, a strong peak having the maximum value in the range of 2θ=0° to 5° is detected, and particles (molecular aggregates) formed by aggregation of phthalocyanine-based coloring material molecules are found to be arranged by a certain regulation. FIG. 2 shows the scattering angle profile in a 10-mass % aqueous solution of each of a triphenylmethane-based coloring material having a structure represented by Compound (1) below and a phthalocyanine-based coloring material having the structure represented by the general formula (I). FIG. 2 shows that phthalocyanine-based coloring materials specifically have scattering angle peaks even when they have the same cyan hue. In other words, several phthalocyanine molecules aggregate in an aqueous solution of a phthalocyanine-based coloring material to form molecular aggregates. In addition, the distances between the molecular aggregates have such a constant distribution as may be represented by a scattering angle profile.

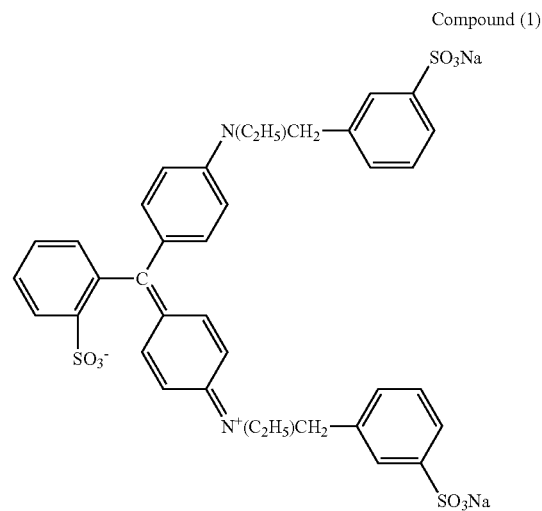

Compound (1)

Figure 3:
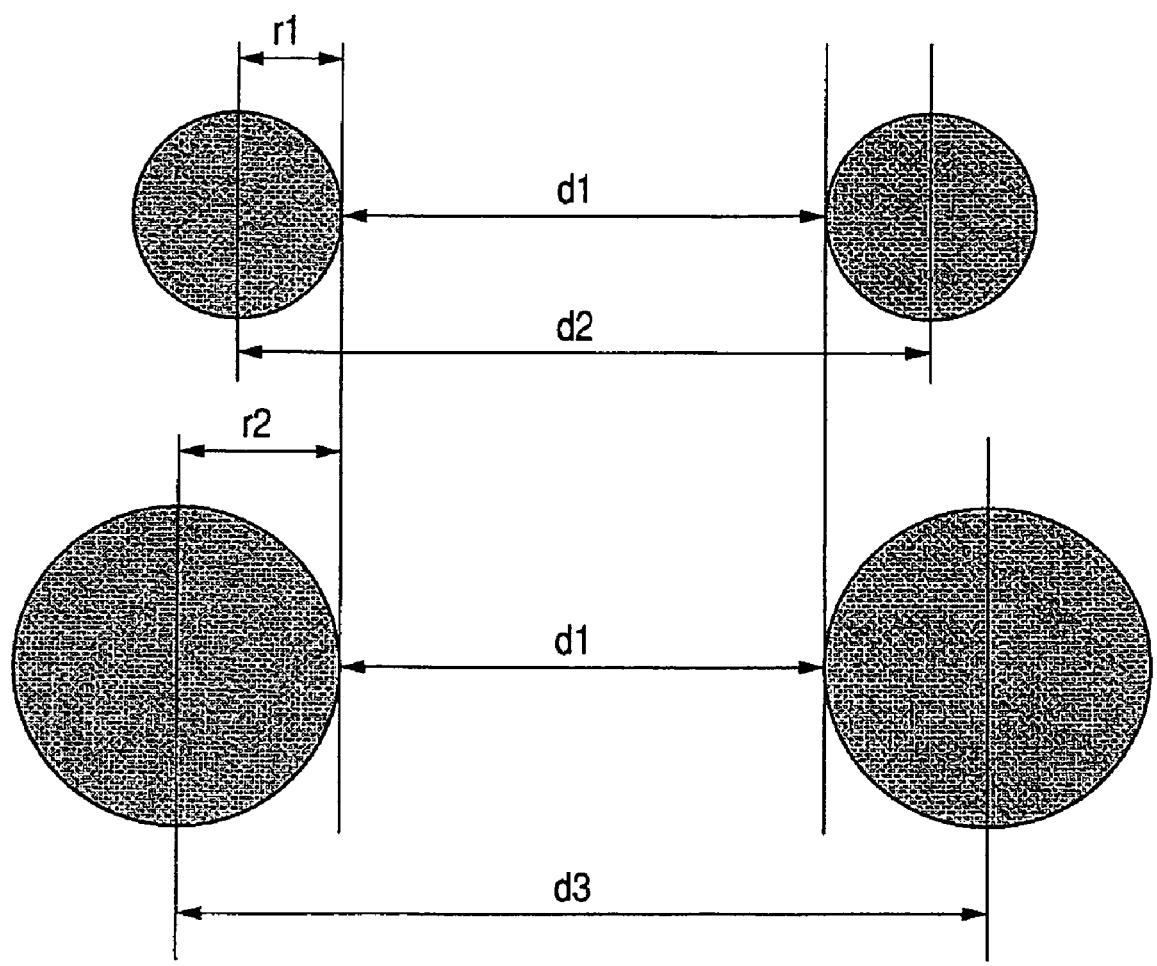
FIG. 3 is a conceptual diagram of the dispersion distance between molecular aggregates of a phthalocyanine-based coloring material.

FIG. 3 is a schematic view of a dispersion distance between molecular aggregates of a phthalocyanine-based coloring material. As shown in FIG. 3, the radius of a certain molecular aggregate of the phthalocyanine-based coloring material is denoted by r1 and a distance between molecular aggregates is denoted by d1. Assuming that d1 is always constant when the structure of the phthalocyanine-based coloring material remains unchanged, the d value measured by a small-angle X-ray scattering method is considered to increase from d2 to d3 as the radius of the molecular aggregate formed by the phthalocyanine-based coloring material increases from r1 to r2. Accordingly, the d value measured by the above method is considered to be an indication of the size of the molecular aggregate of the phthalocyanine-based coloring material, and the size of the molecular aggregate formed from coloring material molecules is considered to increase as the d value increases.

Investigation into the relationship between the d value in ink containing a phthalocyanine-based coloring material and the bronze phenomenon has revealed that in the case of phthalocyanine-based coloring materials represented by the same structural formula, the bronze phenomenon is more likely to occur as the d value is larger. Taking into consideration the fact that the bronze phenomenon occurs owing to the aggregation of coloring material molecules on a recording medium, it has been supported that there is the correlation between the d value described above and the size of a molecular aggregate.

A peak shape in a scattering angle profile indicates the distribution of a distance between molecular aggregates, that is, the distribution of the dispersion distance between the molecular aggregates. Taking into consideration the above-described fact that the dispersion distances are an indication of the sizes of molecular aggregates, such scattering angle profile is supposed to indicate the distribution of the sizes of molecular aggregates in a solution. In other words, assuming that the peak area of a scattering angle profile shows the sizes of the entire molecular aggregates in a solution, the bronze phenomenon tends to be more likely to occur as the d value is larger, that is, the frequency of large molecular aggregates is higher. Therefore, reducing the frequency of large molecular aggregates which are apt to cause the bronze phenomenon is expected to be capable of suppressing the occurrence of the bronze phenomenon. However, in the case of ink containing only significantly small molecular aggregates, the environmental gas resistance of the ink is lowered, although the bronze phenomenon is less likely to occur. Accordingly, the sizes of molecular aggregates (the absolute value of the d value) must be appropriately controlled for suppressing the occurrence of the bronze phenomenon and for obtaining environmental gas resistance.

In general, when the sizes of coloring material molecules have a certain frequency distribution, the threshold value of the visual sense which is the limit of the observability of a human being is said to be 25% of the entire amount. In view of the above, the d value at the point at which large molecular aggregates causative of the bronze phenomenon comes to account for 25% or less of the entire aggregates, i.e., the point at which small molecular aggregates which hardly cause the bronze phenomenon accounts for 75% or more of the entire aggregates is defined as a $d_{75}$ value and the $d_{75}$ value is so controlled as to fall within a specific range, whereby ink which suppresses the occurrence of the bronze phenomenon and has high environmental gas resistance can be obtained.

In actuality, according to investigation into the correlation between each of a $d_{peak}$ value calculated from the peak of a $2\theta$ value in a scattering angle profile and the above-described $d_{75}$ value, and the occurrence level of the bronze phenomenon, it has been found that the $d_{75}$ value in which a distribution factor of the sizes of the entire molecular aggregates is taken into account has a stronger correlation with the bronze phenomenon than the $d_{peak}$ value. A base line for determining the $2\theta$ value is drawn in the range of 0.5° to 50.

In view of the above, the inventors of the present invention have conducted the following experiment by means of a compound obtained by changing the number, kinds, and substitution positions of substituents in a compound represented by the general formula (I) or a salt thereof to serve as a phthalocyanine-based coloring material in the light-color ink of the present invention, that is, by means of a dye with its aggregation properties controlled. Light-color ink containing the coloring material was prepared, and the scattering angle profile of the ink was measured to calculate a $d_{75}$ value. Next, each coloring material was evaluated for aggregation properties by means of the resultant $d_{75}$ value. As a result, it was found that the ink effectively suppresses the occurrence of the bronze phenomenon and has high environmental gas resistance in the case where the $d_{75}$ value is 6.70 nm or more and 10.60 nm or less. It was also found that the ink particularly effectively suppresses the occurrence of the bronze phenomenon and has particularly high environmental gas resistance in the case where the $d_{75}$ value is 6.70 nm or more and 9.10 nm or less. In other words, it was found that light-color ink containing a compound represented by the general formula (I) or a salt thereof as a coloring material effectively suppresses the occurrence of the bronze phenomenon and has high environmental gas resistance in the case where the aggregation properties of the coloring material is controlled in such a manner that the $d_{75}$ value of the light-color ink falls within the above range.

A molecular density in a solution must be kept constant in order to measure the d value by a small-angle X-ray scattering method. Therefore, the d value is preferably measured by using ink with its coloring material concentration kept constant. In the present invention, a scattering angle profile was measured using light-color ink prepared in such a manner that the coloring material content (mass %) would be 0.5 mass % with respect to the total mass of the ink. When ink had a coloring material content in excess of 0.5 mass %, the ink was diluted with pure water to have a coloring material concentration of 0.5 mass %, and the scattering angle profile of the diluted ink was measured. The fact that ink has a coloring material content of 0.5 mass % can be examined on the basis of the fact that the absorbance measured after diluting 150 times the ink with pure water is in the range of 1.15 to 1.30.

In addition, the inventors of the present invention have conducted the following experiment by means of a compound obtained by changing the number, kinds, and substitution positions of substituents in a compound represented by the general formula (I) or a salt thereof to serve as a phthalocyanine-based coloring material in deep-color ink to be used in combination with the light-color ink of the present invention, that is, by means of a dye with its aggregation properties controlled. Deep-color ink containing the coloring material was prepared, and the scattering angle profile of the ink was measured to calculate a $d_{75}$ value. Next, each coloring material was evaluated for aggregation properties by means of the resultant $d_{75}$ value. As a result, it was found that the ink has a high coloring material concentration in order to obtain good color developability, and effectively suppresses the occurrence of the bronze phenomenon and has high environmental gas resistance even when printing is performed by using the deep-color ink in combination with the above-described light-color ink in the case where the $d_{75}$ value is 6.50 nm or more and 7.10 nm or less. It was also found that the ink particularly effectively suppresses the occurrence of the bronze phenomenon and has particularly high environmental gas resistance in the case where the $d_{75}$ value is 6.70 nm or more and 7.10 nm or less. In other words, it was found that deep-color ink containing a compound represented by the general formula (I) or a salt thereof as a coloring material has a high coloring material concentration in order to obtain good color developability, and effectively suppresses the occurrence of the bronze phenomenon and has high environmental gas resistance even when printing is performed by using the deep-color ink in combination with the above-described light-color ink in the case where the aggregation properties of the coloring material is controlled in such a manner that the $d_{75}$ value of the deep-color ink falls within the above range.

As described above, a molecular density in a solution must be kept constant in order to measure the d value by means of small-angle X-ray scattering method. Therefore, the d value is preferably measured using ink with its coloring material concentration kept constant. In the present invention, a scattering angle profile was measured using deep-color ink to be used in combination with the light-color ink of the present invention prepared in such a manner that the coloring material content (mass %) would be 3.0 mass % with respect to the total mass of the ink. When ink had a coloring material content in excess of 3.0 mass %, the ink was diluted with pure water to have a coloring material concentration of 3.0 mass %, and the scattering angle profile of the diluted ink was measured. The fact that ink has a coloring material content of 3.0 mass % can be examined on the basis of the fact that the absorbance measured after diluting 1,000 times the ink with pure water is in the range of 1.05 to 1.15.

The conditions under which the absorbance is measured are as follows.

Spectrophotometer: Self-recording spectrophotometer (trade name: U-3300; manufactured by Hitachi, Ltd.)

Measurement cell: 1 cm quartz cell
Sampling interval: 0.1 nm
Scanning rate: 30 nm/min
Number of measurements: Measurement is performed five times to take the average value of the five measurements.

The aggregation properties of a coloring material described above has a correlation also with the maximum absorption wavelength (λmax) in an absorption spectrum. Ink having higher molecular aggregation properties (a higher $d_{75}$ value) tends to have smaller λmax. Therefore, a coloring material can be evaluated for aggregation properties by means of λmax having a correlation with the $d_{75}$ value. In this case, it has been found that light-color ink effectively suppresses the occurrence of the bronze phenomenon and has high environmental gas resistance when λmax in the light-color ink diluted 2,000 times with pure water is 608.0 nm or more and 613.0 nm or less. It has also been found that light-color ink particularly effectively suppresses the occurrence of the bronze phenomenon and has particularly high environmental gas resistance when the λmax is 610.0 nm or more and 613.0 nm or less. In other words, in the case where the aggregation properties of a compound represented by the general formula (I) or a salt thereof as a coloring material is controlled in such a manner that the λmax of the ink containing the coloring material falls within the above range, the ink is found to suppress the occurrence of the bronze phenomenon and have high environmental gas resistance. It has been also found that deep-color ink has a high coloring material concentration in order to obtain good color developability, and effectively suppresses the occurrence of the bronze phenomenon and has high environmental gas resistance even when printing is performed by using the deep-color ink in combination with the above-described light-color ink in the case where λmax in the deep-color ink diluted 2,000 times with pure water is 612.0 nm or more and 616.0 nm or less. It has been also found that the ink has a high coloring material concentration in order to obtain good color developability, and particularly effectively suppresses the occurrence of the bronze phenomenon and has particularly high environmental gas resistance in the case where the λmax is 612.0 nm or more and 614.0 nm or less. In other words, in the case where the aggregation properties of a compound represented by the general formula (I) or a salt thereof as a coloring material is controlled in such a manner that the λmax of the ink containing the coloring material falls within the above range, the ink is found to have a high coloring material concentration in order to obtain good color developability, and effectively suppress the occurrence of the bronze phenomenon and have high environmental gas resistance even when printing is performed by using the ink in combination with the above-described light-color ink. The conditions under which the maximum absorption wavelength is measured are the same as the above-described conditions under which the absorbance is measured.

The coloring material to be used in the present invention is known to be less likely to aggregate when it has a smaller number of unsubstituted sulfamoyl group and a larger number of substituted sulfamoyl groups or of sulfonic groups. In particular, in the case where a coloring material satisfies the requirement concerning the $d_{75}$ value in the present invention, the coloring material preferably contains a compound in which the number of substituents $1 \geq 1$ in the compound represented by the general formula (I) or a salt thereof, or in the compound represented by the general formula (II) or the salt thereof because the aggregation of the coloring material can be suppressed.

[Method of Testing Coloring Material]

Exemplified Compound 1 (the compound represented by the general formula (II) or a salt thereof), which is an example of the coloring material used in the present invention, can be tested by the following methods (1) to (3) each of which involves the use of high performance liquid chromatography (HPLC).
(1) Retention time of the peak
(2) Maximum absorption wavelength in the peak of (1)
(3) M/Z (posi) of mass spectrum in the peak of (1)

Analysis conditions for high performance liquid chromatography are as shown below. An ink solution diluted 50 times with pure water is analyzed by means of high performance liquid chromatography under the following conditions to measure the retention time of a main peak and the maximum absorption wavelength of a peak.

Column: Symmetry C18 2.1 mm×150 mm
Column temperature: 40° C.
Flow rate: 0.2 ml/min
PDA: 210 nm to 700 nm
Mobile phase and gradient condition: Table 3

TABLE 3

|  | 0–15 min | 15–30 min |
|---|---|---|
| A Water | 87.5%→0% | 0% |
| B Acetonitrile | 10%→97.5% | 97.5% |
| C 0.2-mol/l aqueous solution of ammonium acetate | 2.5% | 2.5% |

In addition, analysis conditions for a mass spectrum are as shown below. The mass spectrum of the resultant peak is measured under the following conditions, and the M/Z (posi) is measured.

| Ionization method | |
|---|---|
| ESI Capillary voltage | 3.1 kV |
| Desolvating gas | 300° C. |
| Ion source temperature | 120° C. |

Detector posi 40 V 500–2,000 amu/0.9 sec

Table 4 shows the values of the retention time, maximum absorption wavelength, and M/Z of Exemplified Compound 1. When a compound has values shown in Table 4, the compound can be judged to be a compound to be used in the present invention. In the coloring material to be used in the present invention, the peak ratio of the mass spectrum obtained from a peak of high performance liquid chromatography (HPLC) varies depending on a mixing ratio of isomers different from each other in kinds, substitution positions, and number of substituents in the coloring material, but the peak of M/Z described in Table 4 below is characterized in that it is always detected. Therefore, the present method of testing a coloring material is effective in examining whether ink contains the coloring material used in the present invention.

TABLE 4

| Retention time [min] | Maximum absorption wavelength [nm] | M/Z(Posi) |
|---|---|---|
| 6.9–7.2 | 600–620 | 1670–1672 |

(Aqueous Medium)

An ink composition of the present invention can use water or an aqueous medium which is a mixed solvent of water and any one of various water-soluble organic solvents.

There is no particular limitation concerning the water-soluble organic solvent as long as they are water-soluble, and preferable examples thereof include: an alkyl alcohol having 1 to 4 carbon atoms such as ethanol, isopropanol, n-butanol, isobutanol, 2-butanol, or 3-butanol; a carboxylic acid amide such as N,N-dimethylformamide or N,N-dimethylacetamide; a ketone or a keto alcohol such as acetone, methyl ethyl ketone, or 2-methyl-2-hydroxypentan-4-one; a cyclic ether such as tetrahydrofuran or dioxane; a polyhydric alcohol such as glycerin, ethylene glycol, diethylene glycol, triethylene glycol, tetraethylene glycol, 1,2 or 1,3-propylene glycol, 1,2 or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, or trimethylolpropane; an alkyl ether of a polyhydric alcohol such as ethylene glycol monomethyl (or ethyl) ether, diethylene glycol monomethyl (or ethyl) ether, or triethylene glycol monoethyl (or butyl) ether; a heterocyclic compound such as 2-pyrrolidone, N-methyl-2-pyrrolidone, 1,3-dimethyl-2-imidazolidinone, or N-methylmorpholine; a sulfur-containing compound such as dimethyl sulfoxide; and urea and a urea derivative. Each of those water-soluble organic solvents may be used alone, or two or more of them may be used as a mixture.

The content of such water-soluble organic solvent is preferably 5.0 mass % to 90.0 mass %, or more preferably 10.0 mass % to 50.0 mass % with respect to the total mass of ink. The reason for the above is as follows. If the content is smaller than the range, reliability for ejection properties, etc. may lower when the water-soluble organic solvent is used for ink jet ink, on the other hand, if the content is larger than the range, insufficient ink supply due to an increase in viscosity of ink may occur.

Deionized water (ion-exchanged water) is preferably used as water. The water content is preferably 10.0 mass % to 90.0 mass % with respect to the total mass of ink.

In the present invention, among the above-described water-soluble organic solvents, 2-pyrrolidone is preferable because it has a particularly effective suppressing effect on the occurrence of the bronze phenomenon when it is used in combination with a compound represented by the general formula (I) or a salt thereof. The content (mass %) of 2-pyrrolidone in ink is preferably 50.0% or more with respect to the content (mass %) of the coloring material in order to obtain the effect by incorporating 2-pyrrolidone into the ink.

Examples of a water-soluble organic solvent having the same effect as 2-pyrrlidone include a polyethylene glycol (having a molecular weight of 200 or more) and an alkyl ether of a polyhydric alcohol such as triethylene glycol monoethyl ether.

The mechanism with which those specific water-soluble organic solvents can suppress the occurrence of the bronze phenomenon is unclear, but is estimated to be as follows. The $d_{75}$ value of ink obtained by means of small-angle X-ray scattering method does not change depending on the presence or absence of those specific water-soluble organic solvents in the ink. In view of this, those specific water-soluble organic solvents do not change the aggregation properties of a coloring material in the ink, and are capable of suppressing the aggregation of molecular aggregates of the coloring material on a recording medium. The content (mass %) of those specific water-soluble organic solvents in ink is preferably 50.0% or more with respect to the content (mass %) of the coloring material in order to obtain the effect by incorporating those specific water-soluble organic solvents into the ink.

(Other Additive)

In addition, in the present invention, various additives such as a surfactant, a pH adjustor, a rust inhibitor, an antiseptic, a mildewproofing agent, a chelating agent, a UV absorber, a viscosity modifier, a defoaming agent, and a water-soluble polymer may be incorporated as required.

Specific examples of the surfactant include an anionic surfactant, an ampholytic surfactant, a cationic surfactant, and a nonionic surfactant.

Specific examples of the anionic surfactant include: an alkyl sulfocarboxylate; an α-olefin sulfonate; a polyoxyethylene alkyl ether acetate; N-acylamino acid or a salt thereof; an N-acylmethyltaurine salt; an alkyl sulfonate polyoxyalkyl ether sulfonate; an alkyl sulfonate polyoxyethylene alkyl ether phosphate; resin acid soap; a castor oil sulfonate; lauryl alcohol sulfonate; an alkyl phenol phosphate; an alkyl phosphate; an alkyl allyl sulfonate; a diethyl sulfosuccinate; and a diethyl hexyl sulfosuccinate dioctyl sulfosuccinate.

Specific examples of the cationic surfactant include a 2-vinylpyridine derivative and a poly4-vinylpyridine derivative. Examples of the ampholytic surfactant include lauryl dimethyl aminoacetic acid betaine, 2-alkyl-N-carboxymethyl-N-hydroxyethylimidazolinium betaine, coconut oil fatty amide propyl dimethyl aminoacetic acid betaine, polyoctyl polyamino ethyl glycin, and other imidazoline derivatives.

Specific examples of the nonionic surfactant include: ethers such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ether, and polyoxyaralkyl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol-based nonionic surfactants such as 2,4,7,9-tetramethyl-5-decyne-4,7-diol, 3,6-dimethyl-4-octyne-3,6-diol, and 3,5-dimethyl-1-hexyen-3-ol (for example, Acetylenol EH manufactured by Kawaken Fine Chemicals Co., Ltd. and Surfynol 104, 82, and 465, and Olfin STG manufactured by Nissin Chemical Industry Co., Ltd.).

Any substance can be used as a pH adjustor as long as the substance is capable of adjusting the pH of ink to fall within the range of 6.0 to 11.0. Examples of such substance include: alcoholamine compounds such as diethanolamine, triethanolamine, isopropanolamine, and trishydroxymethylaminomethane; hydroxides of alkali metals such as lithium hydroxide and potassium hydroxide; ammonium hydroxide; and carbonates of alkali metals such as lithium carbonate, sodium carbonate, and potassium carbonate. Of those, alcoholamine compounds such as diethanolamine, triethanolamine, isopropanolamine, and trishydroxymethylaminomethane, and carbonates of alkali metals such as lithium carbonate, sodium carbonate, and potassium carbonate are preferable because each of them has a suppressing effect on the occurrence of the bronze phenomenon.

Specific examples of the antiseptic and the mildewproofing agent include organic sulfur-based, organic nitrogen sulfur-based, organic halogen-based, haloallylsulfone-based, iodopropagil-based, N-haloalkylthio-based, benzothiazole-based, nithochirile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiadiazole-based, anilide-based, adamantane-based, dithiocarbamate-based, brominated indanone-based, benzyl bromoacetate-based, and inorganic salt-based compounds.

An example of the organic halogen-based compound includes pentachlorophenol sodium. An example of the pyridine oxide-based compound includes 2-pyridinethiol-1oxide sodium. An example of the inorganic salt-based compound includes soda acetic anhydride. Examples of the isothiazoline-based compound include: 1,2-benzoisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, and 5-chloro-2-methyl-4-isothiazolin-3-one calcium chloride. Other specific examples of the antiseptic and the mildewproofing agent include soda sorbate sodium benzoate such as Proxel GXL (S) and Proxel XL-2 (S) manufactured by Avecia.

Examples of the chelating agent include sodium citrate, sodium ethylenediamine tetraacetate, sodium dinitrotriacetate, sodium hydroxyethylethylenediamine triacetate, sodium diethylenetriamine pentaacetate, and sodium uramil diacetate.

Examples of the rust inhibitor include an acid sulfite, sodium thiosulfate, ammonium thioglycolate, diisopropylammonium nitrite, pentaerythritol tetrahitrate, and dicyclohexylammonium nitrite.

Examples of the UV absorber include a benzophenone-based compound, a benzotriazole-based compound, a cinnamic acid-based compound, a triazine-based compound, a stilbene-based compound, or compounds that absorb ultraviolet light to emit fluorescence typified by a benzoxazole-based compound, so-called fluorescent whitening agents.

Examples of the viscosity modifier include water-soluble polymer compounds in addition to water-soluble organic solvents, and examples of the water-soluble polymer compounds include polyvinyl alcohol, a cellulose derivative, polyamine, and polyimine.

A fluorine-based or silicone-based compound is used as the defoaming agent as required.

<Recording Medium>

Any recording medium can be used for forming images by means of the ink of the present invention as long as recording is performed by applying the ink to the recording medium.

The present invention is applicable to a recording medium in which a coloring material such as a pigment is adsorbed to fine particles forming a porous structure in an ink-receiving layer and an image is formed from at least the fine particles with the coloring material adsorbed thereto, and is particularly suitable for the case where an ink jet method is used. Such an ink jet recording medium is preferably of a so-called absorption type in which ink is absorbed by a gap formed in an ink-receiving layer on a support.

An absorption type ink-receiving layer is constituted as a porous layer mainly composed of fine particles and containing a binder and any other additive as required. Specific examples of the fine particles include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them may be used. Examples of a binder that is suitably used include a water-soluble polymer and latex. For example, the following may be cited: polyvinyl alcohol or a modified product thereof; starch or a modified product thereof; gelatin or a modified product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them may be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having an ink-receiving layer formed thereon which is mainly composed of fine particles having an average particle size of 1 μm or less is preferably used in the present invention. Specific examples of the fine particles include silica fine particles and aluminum oxide fine particles. Preferable silica fine particles are silica fine particles typified by colloidal silica. Colloidal silica, which itself is available in the market, is particularly preferably what is described in Japanese Patent No. 2803134 or Japanese Patent No. 2881847. Preferable aluminum oxide fine particles are alumina hydrate fine particles and the like. An alumina hydrate represented by the following general formula may be exemplified as one example of such alumina hydrate fine particles.

$Al_2O_{3-n}(OH)_{2n} \cdot mH_2O$ (In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, when heating such kind of material, m may reach 0.)

An alumina hydrate can be produced by a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in Japanese Patent No. S57-44605.

The recording medium preferably has a support for supporting the above-described ink-receiving layer. Any support may be use without any particular limitation as long as its ink-receiving layer can be formed of the above-described porous fine particles and it provides rigidity which enables it to be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer in which a white pigment or the like is added.

<Ink Set>

The light-color ink of the present invention can be preferably used in combination with any other ink to provide an ink set. The term "ink set" as used herein includes, of course, an ink tank itself obtained by integrating multiple ink tanks. The term also includes a state where multiple ink tanks different from each other are used together and a state where those ink tanks and a recording head are integrated. Examples of such state include a state where the light-color ink of the present invention and deep-color ink to be used in combination therewith are charged into different ink tanks and a state where an ink cartridge in which the light-color ink of the present invention and any other ink are integrated and an ink cartridge in which deep-color ink to be used in combination with the light-color ink of the present invention and any other ink are integrated are used together.

<Ink Jet Recording Method>

The ink according to the present invention is particularly suitably used for an ink jet recording method including the step of ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by using the ink according to the present invention includes an ink cartridge including an ink storage portion for storing the ink.

<Recording Unit>

An example of a recording unit suitable for performing recording by using the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 4:
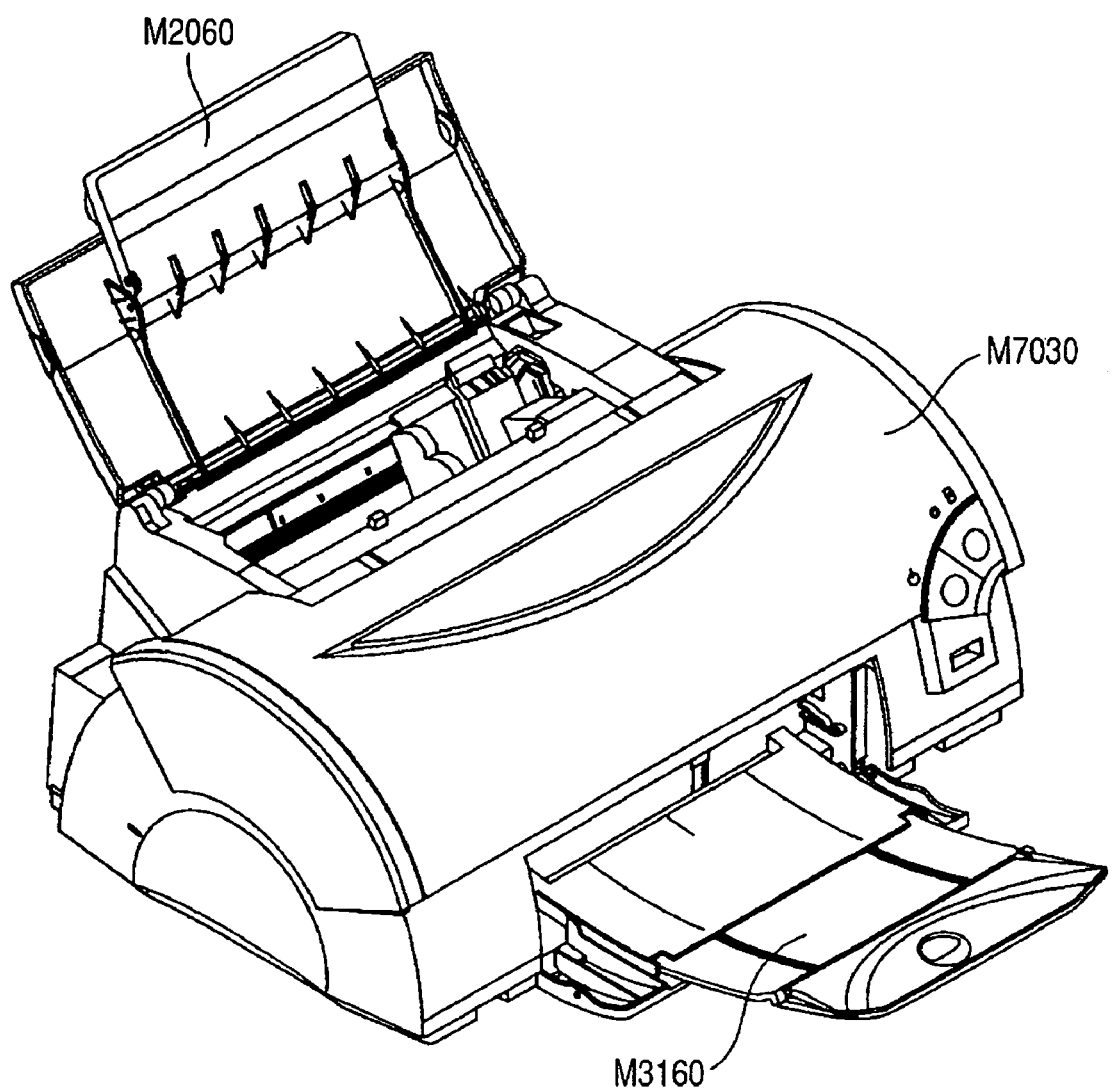
FIG. 4 is a perspective view of a recording apparatus.
Figure 5:
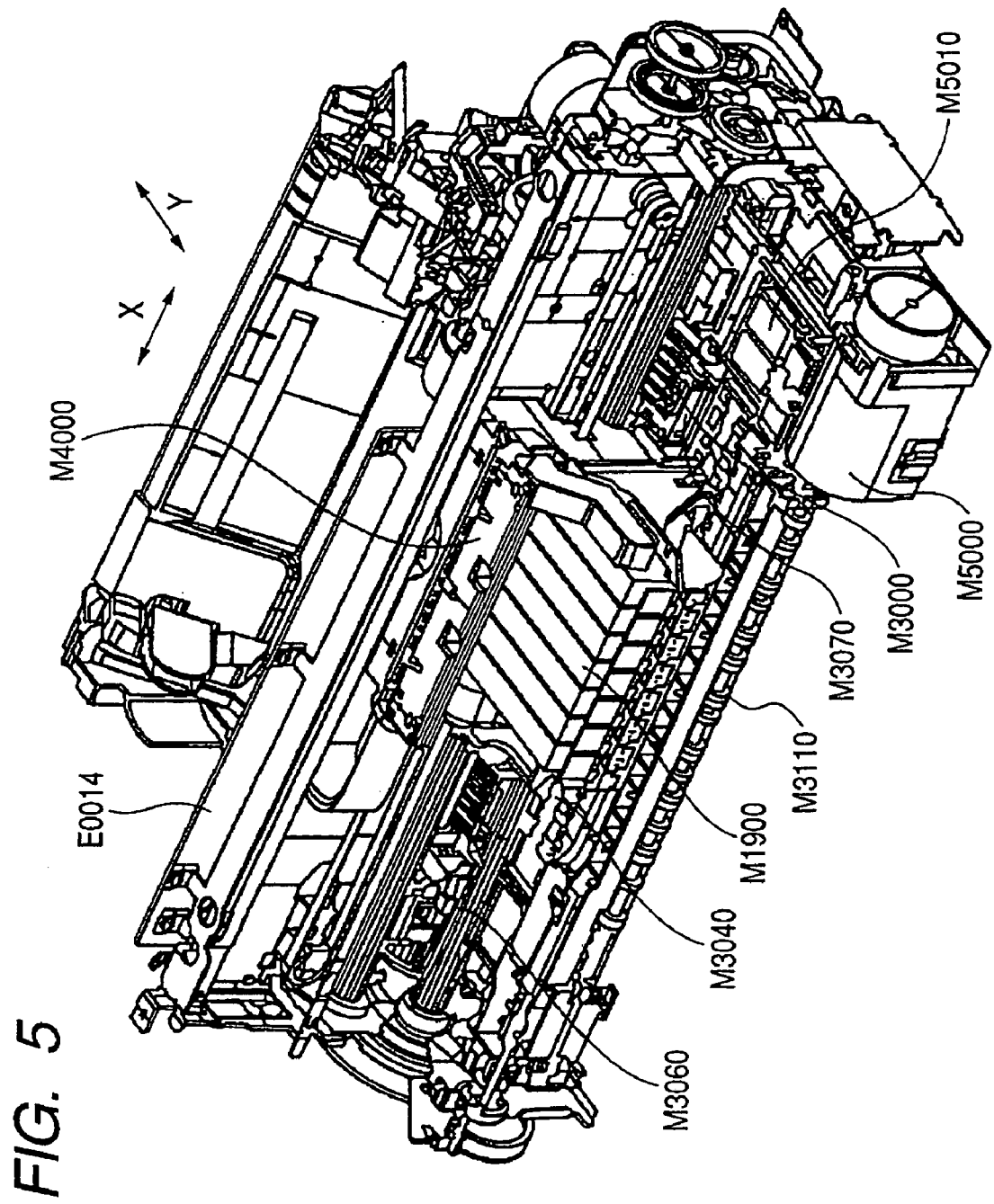
FIG. 5 is a perspective view of a mechanism portion of the recording apparatus.
Figure 6:
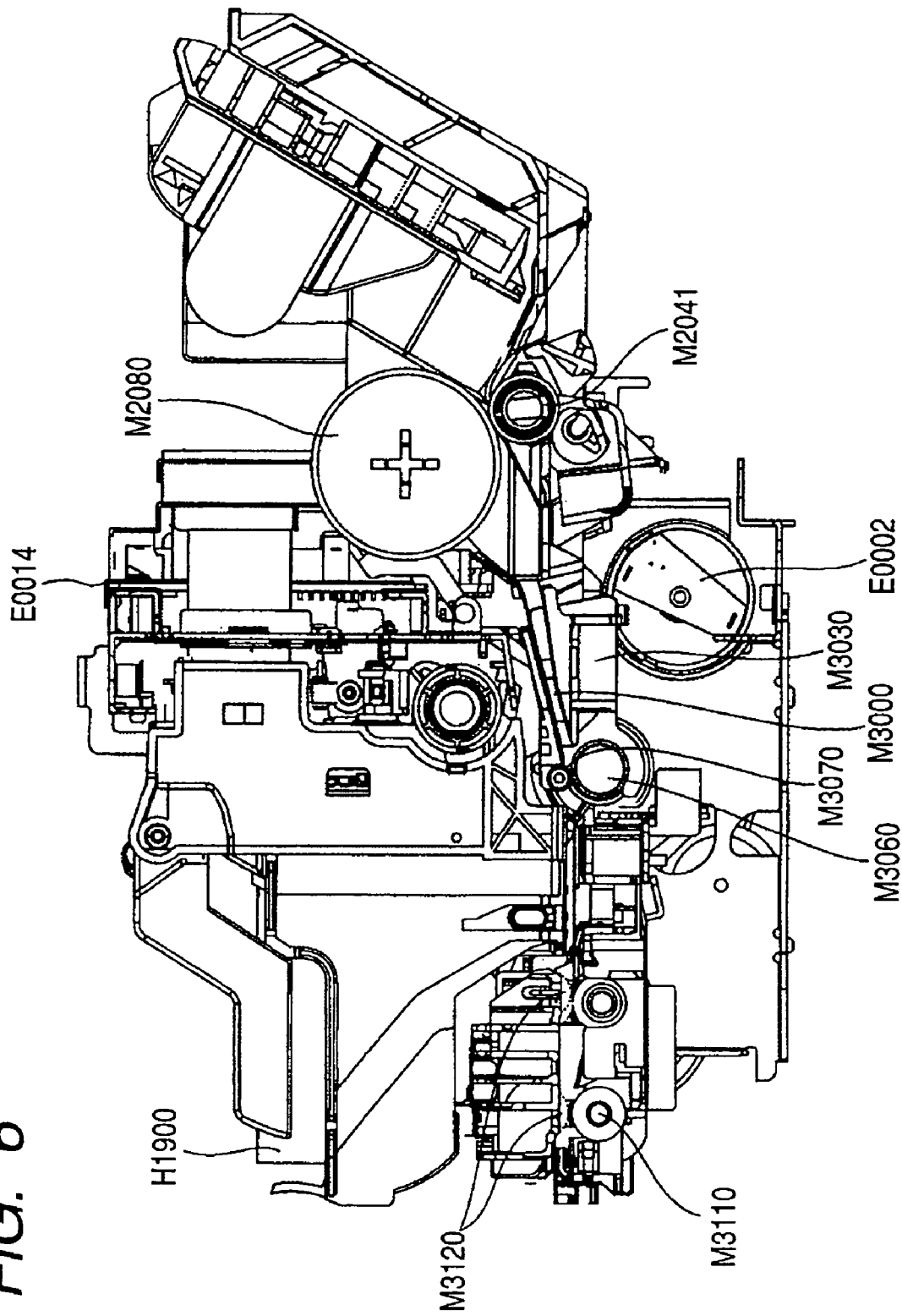
FIG. 6 is a sectional view of the recording apparatus.

FIG. 4 is a perspective view of a recording apparatus. FIGS. 5 and 6 are views for explaining the internal mechanism of a recording apparatus main body. FIG. 5 is a perspective view seen from an upper right portion, and FIG. 6 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 7) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described below. The head cartridge H1000 includes the recording head H1001, means for mounting ink tanks H1900, and means for supplying ink from the ink tanks H1900 to the recording head, and is detachably mounted on the carriage M4000.

Figure 7:
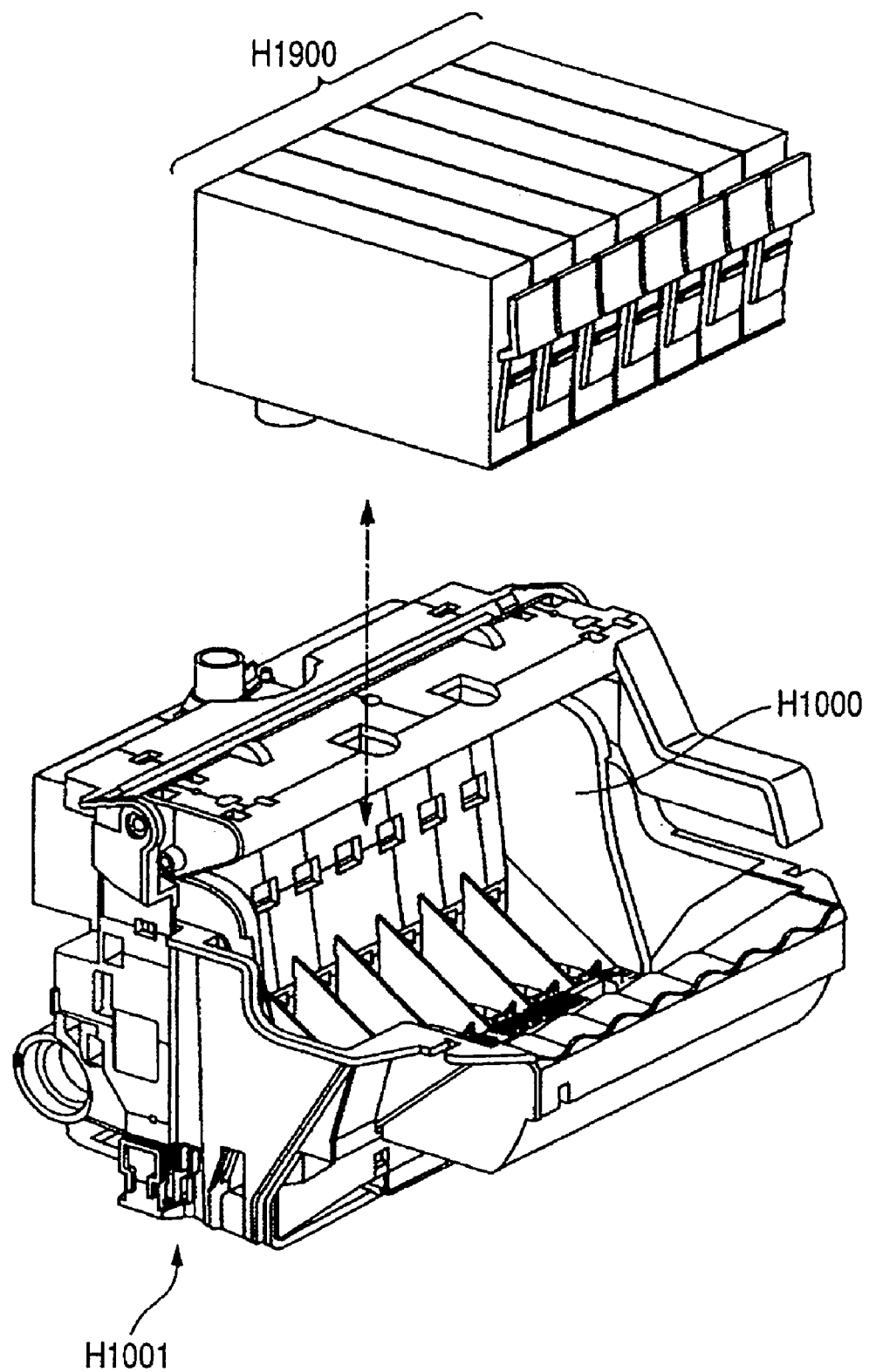
FIG. 7 is a perspective view showing a state in which an ink tank is mounted on a head cartridge.

FIG. 7 shows how the ink tanks H1900 are mounted on the head cartridge H1000. The recording apparatus forms images by means of yellow, magenta, cyan, black, light-color magenta, light-color cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 8:
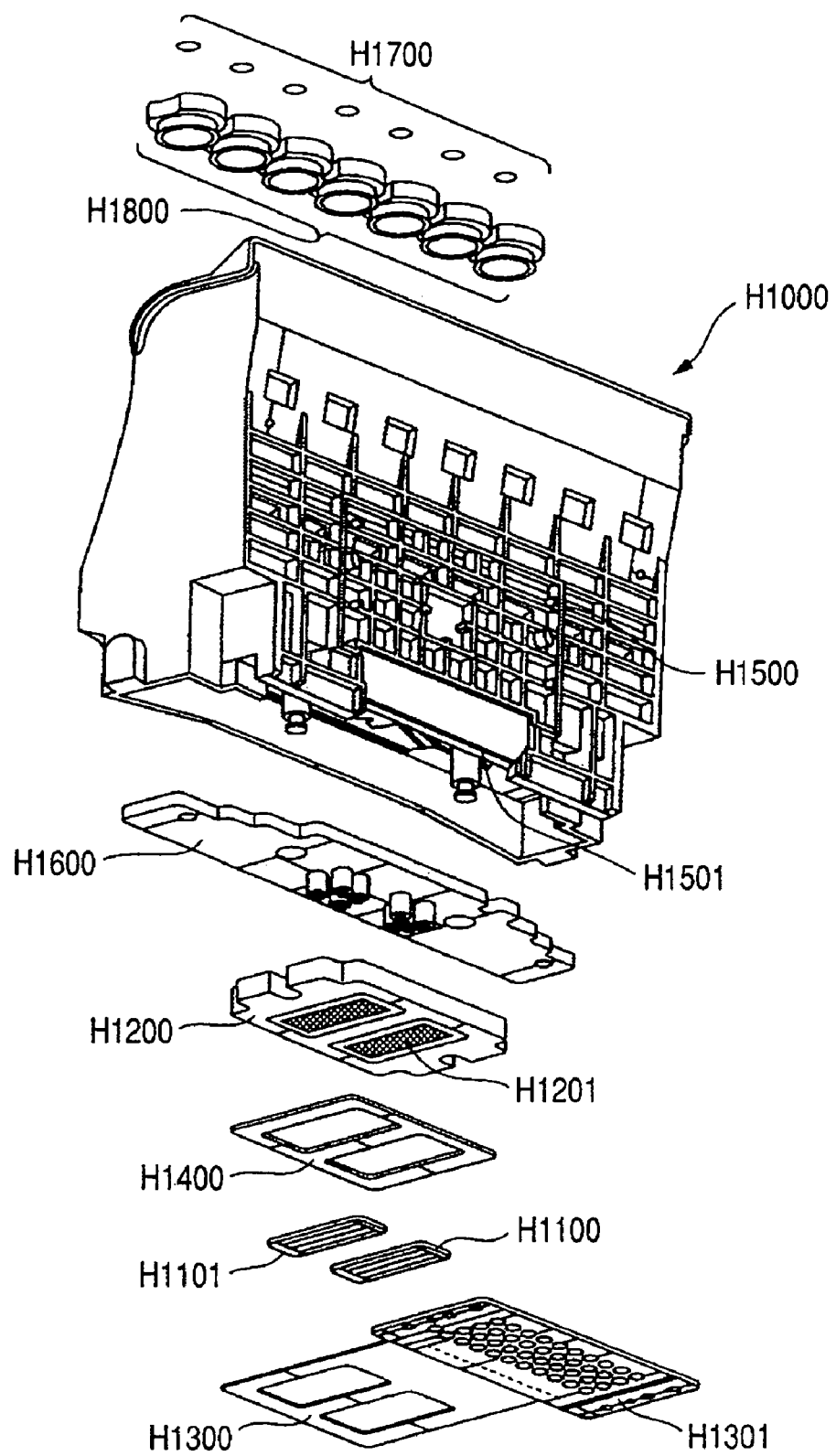
FIG. 8 is an exploded perspective view of the head cartridge.

FIG. 8 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 9:
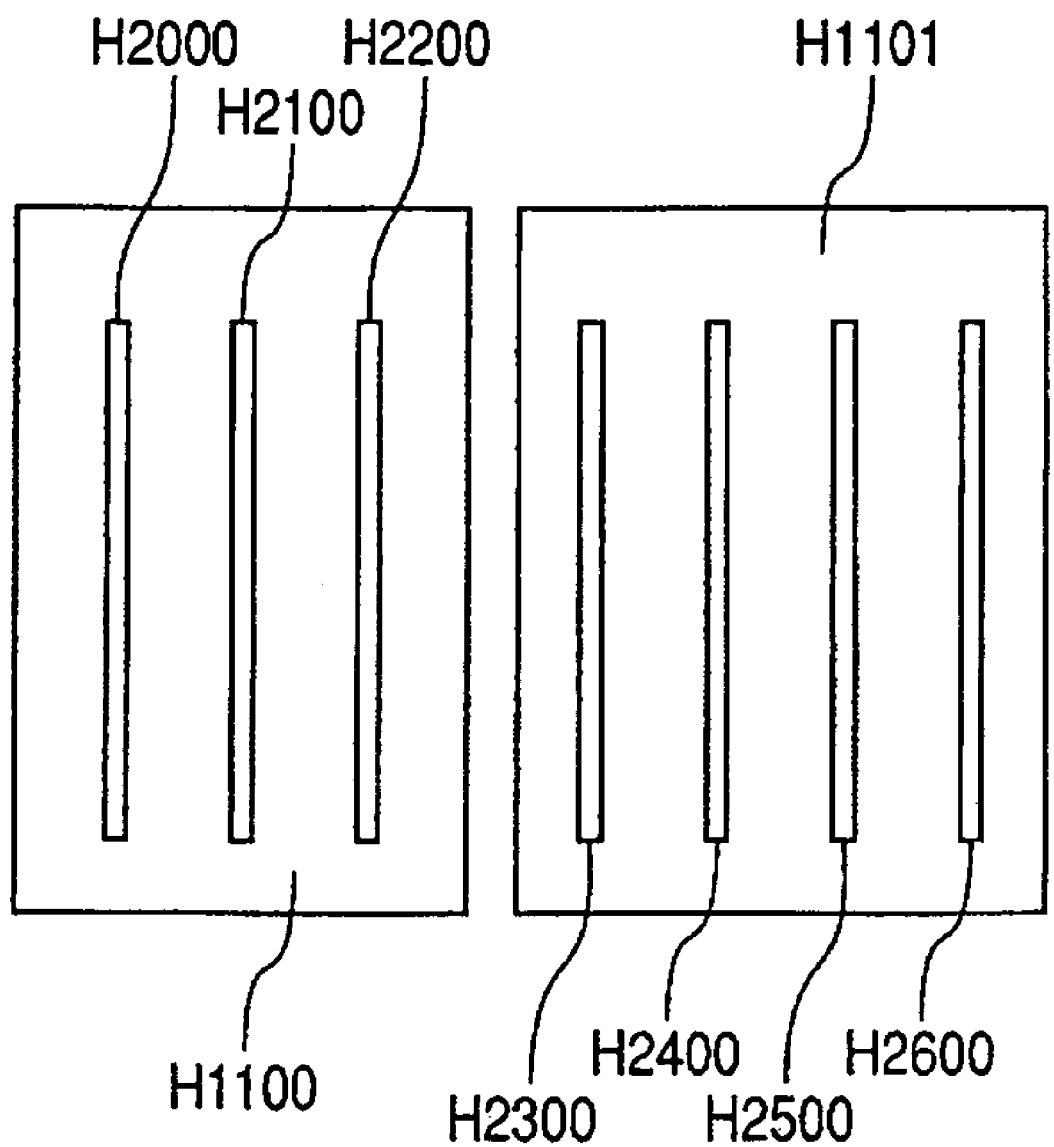
FIG. 9 is a front view showing a recording element substrate in the head cartridge.

FIG. 9 is an enlarged front view for explaining the constitution of each of the first recording element substrate H1100 and the second recording element substrate H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which light-color cyan ink is supplied, the nozzle train H2400 to which black ink is supplied, the nozzle train H2500 to which orange ink is supplied, and the nozzle train H2600 to which light-color magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 $\mu m^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. No. 4,723,129 and U.S. Pat. No. 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble eject the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on-demand ink jet recording head may be cited, including: a nozzle forming substrate having multiple nozzles; pressure generating means arranged so as to be opposite to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples unless the examples depart from the gist of the present invention. Unless otherwise specified, the term "part" of each ink component in examples and comparative examples represents "part by mass".

<Synthesis of Coloring Material>

(1) Synthesis of Tetrasodium Copper Phthalocyanine Tetrasulfonate (Compound (2))

Compound (2)

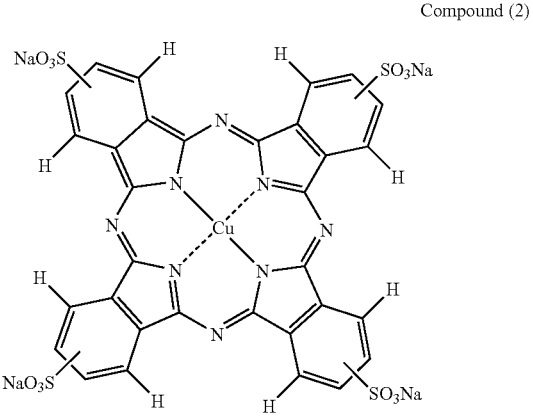

Sulfolane, monosodium 4-sulfophthalate, ammonium chloride, urea, ammonium molybdate, and copper (II) chloride were mixed, stirred, and washed with methanol. After that, water was added to the resultant product, and aqueous solution of sodium hydroxide was used to adjust the pH of the solution to 11. An aqueous solution of hydrochloric acid was added to the resultant solution under stirring, and then sodium chloride was gradually added to separate out crystals. The resultant crystals were filtered out and washed with a 20% aqueous solution of sodium chloride, and then methanol was added. The separated out crystals were filtered out, washed with a 70% aqueous solution of methanol, and dried to prepare tetrasodium copper phthalocyanine tetrasulfonate (Compound (2)) as blue crystals.

(2) Synthesis of Copper Phthalocyanine Tetrasulfonic Chloride (Compound (3))

Compound (3)

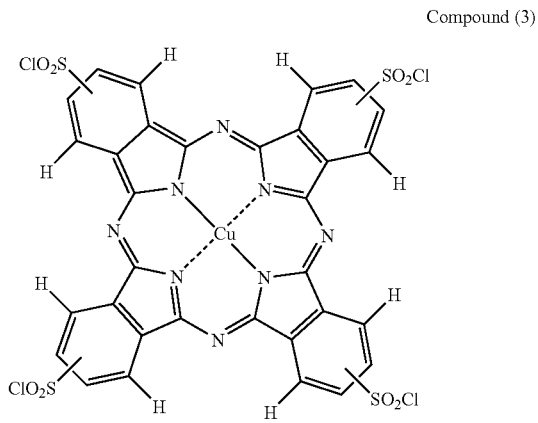

Tetrasodium copper phthalocyanine tetrasulfonate (Compound (2)) thus prepared was gradually added to chlorosulfonic acid, and then thionyl chloride was added dropwise to perform reaction. After that, the reaction solution was cooled, and the separated out crystals were filtered to prepare a wet cake of copper phthalocyanine tetrasulfonic chloride.

(3) Synthesis of the Following Compound (4)

A compound (4) is a compound represented by the general formula (IV) wherein Y represents an amino group and $R_1$ and $R_2$ each represent a sulfone group substituted at the 2 or 5 position.

Compound (4)

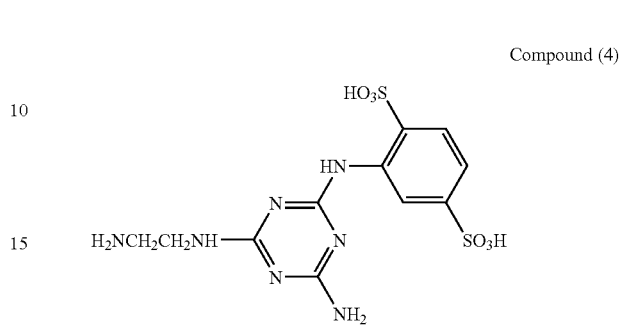

Lipal OH, cyanuric chloride, and monosodium aniline-2,5-disulfonate were added to ice water, and were allowed to react while an aqueous solution of sodium hydroxide was added. Next, an aqueous solution of sodium hydroxide was added to the reaction solution to adjust the pH of the reaction solution to 10. 28% ammonia water and ethylenediamine were added to the reaction solution to perform reaction. Sodium chloride and concentrated hydrochloric acid were added to the resultant reaction solution to separate out crystals. The separated out crystals were filtered and fractionated, and was washed with a 20% aqueous solution of sodium chloride to prepare a wet cake. Methanol and water were added to the resultant wet cake, and the whole was filtered, washed with methanol, and dried to prepare the compound (4).

(4) Synthesis of Coloring Materials A to N

The wet cake of copper phthalocyanine tetrasulfonic chloride (Compound (3)) synthesized in the above (2) was added to ice water, and the whole was stirred to prepare suspension. Ammonia water and the compound (4) synthesized in (3) were added to the suspension to perform reaction. Water and sodium chloride were added to the mixture to separate out crystals. The resultant crystals were filtered out, washed with an aqueous solution of sodium chloride, and filtered again, washed, and dried to prepare a coloring material A as blue crystals. In view of the above reaction, the compound is estimated to be a coloring material which is a compound represented by Exemplified Compound 1 and has average numbers of substituents in the general formula (I) of l=1.0 to 1.5, m=1.0 to 1.5, or n=2.0 to 2.5.

Coloring materials B to N which were compounds each represented by Exemplified Compound 1 and were different from one another in average number of substituents in the general formula (I) were synthesized in the same synthesis procedure as described above. Table 5 below shows the average number of substituents in each of the coloring materials A to N.

TABLE 5

| Coloring material | l | m | n |
|---|---|---|---|
| A | 1.0–1.5 | 1.0–1.5 | 2.0–2.5 |
| B | 0–0.5 | 1.0–1.5 | 2.0–2.5 |
| C | 1.0–1.5 | 1.5–2.0 | 2.0–2.5 |
| D | 0–0.5 | 1.0–1.5 | 2.0–2.5 |

TABLE 5-continued

| Coloring material | l | m | n |
|---|---|---|---|
| E | 0.5–1.0 | 1.0–1.5 | 2.0–2.5 |
| F | 0.5–1.0 | 1.0–1.5 | 2.0–2.5 |
| G | 1.0–1.5 | 1.5–2.0 | 2.0–2.5 |
| H | 1.0–1.5 | 1.0–1.5 | 1.5–2.0 |
| I | 0 | 1.5–2.5 | 1.5–2.5 |
| J | 0 | 1.5–2.0 | 2.0–2.5 |
| K | 0 | 1.5–2.0 | 2.0–2.5 |
| L | 1.0–1.5 | 1.0–1.5 | 2.0–2.5 |
| M | 0 | 1.5–2.5 | 1.5–2.5 |
| N | 0 | 2.5–3.0 | 0.5–1.5 |

<Evaluation of Bronze Resistance>

(1) Preparation of Deep-Color Ink

The respective components shown in Table 6 below were mixed and sufficiently stirred. After that, the resultant was filtered through a membrane filter having a pore size of 0.2 µm under pressure to prepare each of deep-color inks A to E.

TABLE 6

| | Deep-color ink | | | | |
|---|---|---|---|---|---|
| | A | B | C | D | E |
| Coloring material A | 3.0 | | | | |
| Coloring material B | | 3.0 | | | |
| Coloring material C | | | 3.0 | | |
| Coloring material D | | | | 3.0 | |
| Coloring material E | | | | | 3.0 |
| Glycerin | 20.0 | 20.0 | 20.0 | 20.0 | 20.0 |
| Acetylenol EH(*) | 1.0 | 1.0 | 1.0 | 1.0 | 1.0 |
| Ion-exchanged water | 76.0 | 76.0 | 76.0 | 76.0 | 76.0 |

(*)Ethylene oxide adduct of acetylene glycol (surfactant; manufactured by Kawaken Fine Chemicals Co., Ltd.)

(2) Preparation of Light-Color Ink

The respective components shown in Table 7 below were mixed and sufficiently stirred. After that, the resultant was filtered through a membrane filter having a pore size of 0.2 µm under pressure to prepare each of light-color inks A, G, I, J, K, M, and N.

TABLE 7

| | Light-color ink | | | | | | |
|---|---|---|---|---|---|---|---|
| | A | G | I | J | K | M | N |
| Coloring material A | 0.5 | | | | | | |
| Coloring material G | | 0.5 | | | | | |
| Coloring material I | | | 0.5 | | | | |
| Coloring material J | | | | 0.5 | | | |
| Coloring material K | | | | | 0.5 | | |
| Coloring material M | | | | | | 0.5 | |
| Coloring material N | | | | | | | 0.5 |
| Glycerin | 20.0 | 20.0 | 20.0 | 20.0 | 20.0 | 20.0 | 20.0 |
| 2-pyrrolidone | 2.5 | 2.5 | 2.5 | 2.5 | 2.5 | 2.5 | 2.5 |
| Acetylenol EH(*) | 1.0 | 1.0 | 1.0 | 1.0 | 1.0 | 1.0 | 1.0 |
| Ion-exchanged water | 76.0 | 76.0 | 76.0 | 76.0 | 76.0 | 76.0 | 76.0 |

(*)Ethylene oxide adduct of acetylene glycol (surfactant; manufactured by Kawaken Fine Chemicals Co., Ltd.)

(3) Measurement of $d_{75}$ Value

The scattering angle profile of each of the deep-color inks A to E (each having a coloring material concentration of 3.0 mass %) and the light-color inks A, G, I, J, K, M, and N (each having a coloring material concentration of 0.5 mass %) was measured by means of small-angle X-ray scattering method. The scattering angle profile was measured under the following conditions.

Apparatus: Nano Viewer (manufactured by Rigaku)
X-ray source: Cu-Kα
Output: 45 kV–60 mA
Effective focal spot: 0.3 mmΦ+Confocal Max-Flux Mirror
$1^{st}$ Slit: 0.5 mm, $2^{nd}$ Slit: 0.4 mm, $3^{rd}$ Slit: 0.8 mm
Irradiation time: 40 min (deep-color ink), 240 min (light-color ink)
Beam stopper: 3.0 mmΦ
Measurement method: Penetration method
Detector: Blue Imaging Plate A peak area obtained by removing a background and a 2θ value accounting for 75% or more of the entire peak area ($2\theta_{75}$ value) were measured from the resultant scattering angle profile by means of an X-ray diffraction data processing soft JADE (Material Data, Inc.). The $d_{75}$ value was calculated from the $2\theta_{75}$ value on the basis of the following expression (2). Table 8 shows the results.

$$d_{75} = \lambda / 2 \sin \theta_{75} \qquad \text{Eq. (2)}$$

(4) Measurement of Maximum Absorption Wavelength (λmax)

After each of the deep-color inks A to E (each having a coloring material concentration of 3.0 mass %) and the light-color inks A, G, I, J, K, M, and N (each having a coloring material concentration of 0.5 mass %) had been diluted 2,000 times with pure water, the maximum absorption wavelength (λmax) was measured. Table 8 shows the results. The maximum absorption wavelength (λmax) was measured under the following conditions.

Spectrophotometer: Self-recording spectrophotometer (trade name: U-3300; manufactured by Hitachi, Ltd.)
Measurement cell: 1 cm quartz cell
Sampling interval: 0.1 nm
Scanning rate: 30 nm/min
Number of measurements: Measurement was performed five times to take the average value of the five measurements.

TABLE 8

| | Coloring material concentration [mass %] | $d_{75}$ value [nm] | Maximum absorption wavelength λ max[nm] |
|---|---|---|---|
| Deep-color ink A | 3.0 | 6.90 | 613.0 |
| Deep-color ink B | 3.0 | 6.70 | 614.0 |
| Deep-color ink C | 3.0 | 7.10 | 612.0 |
| Deep-color ink D | 3.0 | 6.69 | 614.1 |
| Deep-color ink E | 3.0 | 6.50 | 616.0 |
| Light-color ink A | 0.5 | 6.70 | 613.0 |
| Light-color ink G | 0.5 | 7.52 | 611.9 |
| Light-color ink J | 0.5 | 9.10 | 610.0 |
| Light-color ink K | 0.5 | 9.11 | 609.9 |
| Light-color ink I | 0.5 | 10.60 | 608.0 |
| Light-color ink M | 0.5 | 10.61 | 607.9 |
| Light-color ink N | 0.5 | 14.38 | 603.0 |

(5) Creation of Recorded Article

Each of the deep-color and light-color inks thus prepared was mounted on an ink jet recording apparatus (trade name: Pixus 950i; manufactured by CANON Inc.) to print a gradation pattern, in which the deep-color and light-color inks were superimposed on each other, on an ink jet glossy medium (trade name: PR101; manufactured by CANON Inc.) by changing a printing duty to 5, 12, 21, 29, 35, 43, 51, 58, 66, 74, 85, 90, and 100%. Thus, a recorded article was created.

(6) Evaluation of Bronze Resistance

The printing duty at which the bronze phenomenon occurred in the gradation pattern of the recorded article thus created was visually observed to define the printing duty as the printing duty at which the bronze phenomenon occurred. In general, the bronze phenomenon is apt to occur with increasing the printing duty. In other words, the bronze phenomenon is more likely to occur where the ink has a lower printing duty at which the bronze phenomenon occurs, while the bronzing is less likely to occur where the ink has a higher printing duty at which the bronze phenomenon occurs.

In view of the above, ink was evaluated for bronze resistance on the basis of the printing duty at which the bronzing occurred in a gradation pattern in which predetermined deep-color and light-color ink were superimposed on each other. As shown below, the evaluation criteria for the bronze resistance were composed of 5 stages: AA, A, B, C, and D. Investigation was made into which evaluation criterion a cross portion of the printing duty at which the bronze phenomenon occurred in the gradation pattern corresponded to. The 5 evaluation criteria shown in Table 9 correspond to the results of judgment by visual observation of the occurrence of the bronze phenomenon in a recorded article. For example, ink having a printing duty at which the bronze phenomenon occurs in a gradation pattern evaluated to be AA is at a level at which no bronze phenomenon occurs in a recorded article.

AA: Level at which no bronze phenomenon occurs in a recorded article.
A: Level at which nearly no bronze phenomenon occurs in a recorded article.
B: Level at which visual judgement as to whether bronze phenomenon occurs in a recorded article cannot be made.
C: Level at which visual judgement as to whether bronze phenomenon occurs in a recorded article can be made in some cases.
D: Level at which visual judgement as to whether bronze phenomenon occurs in a recorded article can be made.

On the basis of Table 9, the deep-color inks A to E and the light-color inks A, G, I, J, K, M, and N were used in combination to print a gradation pattern, thereby creating a recorded article. The printing duty at which the bronze phenomenon occurred in the resultant gradation pattern was visually observed, and evaluation on bronze resistance was made on the basis of the cross portion shown in Table 5 corresponding to the printing duty. When the number of evaluation criteria for the printing duty at which the bronze phenomenon occurred was two or more, the worst criterion out of the multiple criteria was adopted. Table 10 shows the results of the evaluation.

TABLE 10

|  |  | Deep-color ink | | | | |
| --- | --- | --- | --- | --- | --- | --- |
|  |  | A | B | C | D | E |
| Example | Light-color ink A | AA | AA | AA | AA | AA |
|  | Light-color ink G | AA | AA | AA | AA | AA |
|  | Light-color ink J | AA | AA | A | AA | AA |
|  | Light-color ink K | A | AA | A | A | AA |
|  | Light-color ink I | B | B | B | B | B |
| Comparative Example | Light-color ink M | C | C | C | C | C |
|  | Light-color ink N | D | D | D | D | D |

<Evaluation of Bronze Resistance and (1) Preparation of Deep-Color Ink

The respective components were mixed and sufficiently stirred in accordance with each of formulations 1 to 4 shown in Table 11 below. After that, the resultant was filtered through a membrane filter having a pore size of 0.2 μm under pressure to prepare a deep-color ink. The deep-color inks prepared in accordance with the formulations 1 to 4 by means of the coloring material A shown in Table 5 were defined as deep-color inks A1 to A4. Concentrated inks A1 to I1 shown in Table 11 below were similarly prepared.

(2) Preparation of Light-Color Ink

The respective components were mixed and sufficiently stirred in accordance with each of formulations 5 to 8 shown in Table 11 below. After that, the resultant was filtered through a membrane

TABLE 9

|  |  | Printing duty of deep-color ink (%) | | | | | | | | | | | | |
| --- | --- | --- | --- | --- | --- | --- | --- | --- | --- | --- | --- | --- | --- | --- |
|  |  | 5 | 12 | 21 | 29 | 35 | 43 | 51 | 58 | 66 | 74 | 85 | 90 | 100 |
| Printing duty of light-color ink (%) | 5 | D | D | D | C | C | C | C | B | B | B | A | A | AA |
|  | 12 | D | D | D | C | C | C | B | B | B | A | A | A | AA |
|  | 21 | D | D | D | C | C | B | B | B | B | A | A | AA | AA |
|  | 29 | D | D | D | C | C | B | B | B | B | A | A | AA | AA |
|  | 35 | D | D | C | C | C | B | B | B | B | A | A | AA | AA |
|  | 43 | D | D | C | C | C | B | B | B | A | A | AA | AA | AA |
|  | 51 | D | D | C | C | B | B | B | B | A | A | AA | AA | AA |
|  | 58 | D | D | C | C | B | B | B | B | A | A | AA | AA | AA |
|  | 66 | D | D | C | C | B | B | B | B | A | A | AA | AA | AA |
|  | 74 | D | C | C | B | B | B | B | A | A | A | AA | AA | AA |
|  | 85 | D | C | C | B | B | B | B | A | A | AA | AA | AA | AA |
|  | 90 | D | C | C | B | B | B | B | A | A | AA | AA | AA | AA |
|  | 100 | C | C | B | B | B | B | A | A | A | AA | AA | AA | AA |

TABLE 11

| | Deep-color ink formulation | | | | Light-color ink formulation | | | |
|---|---|---|---|---|---|---|---|---|
| | Formulation 1 | Formulation 2 | Formulation 3 | Formulation 4 | Formulation 5 | Formulation 6 | Formulation 7 | Formulation 8 |
| Coloring material | 5.0 | 5.0 | 5.0 | 5.0 | 1.5 | 1.5 | 1.5 | 1.5 |
| Glycerin | 5.00 | 5.00 | 5.00 | 5.00 | 10.00 | 10.00 | 10.00 | 10.00 |
| Urea | 10.00 | 10.00 | 10.00 | 10.00 | | | | |
| 2-pyrrolidone | 5.00 | 2.50 | 2.40 | | 2.40 | 0.75 | 0.70 | |
| Ethylene glycol | 8.00 | 8.00 | 8.00 | 8.00 | 8.00 | 8.00 | 8.00 | 8.00 |
| Diethylene glycol | | 2.50 | 2.60 | 5.00 | | 1.70 | 1.80 | 2.50 |
| Acetylenol EH (*) | 0.80 | 0.80 | 0.80 | 0.80 | 0.80 | 0.80 | 0.80 | 0.80 |
| Ion-exchanged water | 66.20 | 66.20 | 66.20 | 66.20 | 77.30 | 77.25 | 77.20 | 77.20 |
| 2-pyrrolidone/Coloring material (**) | 100 | 50 | 48 | 0 | 160 | 50 | 47 | 0 |

(*) Ethylene oxide adduct of acetylene glycol (surfactant; manufactured by Kawaken Fine Chemicals Co., Ltd.)
(**) (Content (mass %) of 2-pyrrolidone/Content (mass %) of coloring material) × 100 [%]

(3) Measurement of $d_{75}$ Value

The scattering angle profile of each of the resultant deep-color and light-color inks was measured by means of small-angle X-ray scattering method; provided that each deep-color ink was diluted 1.67 times with pure water before its scattering angle profile was measured, while each light-color ink was diluted with pure water before the scattering angle profile was measured by the means of small-angle X-ray scattering method. The scattering angle profile was measured under the following conditions.

Apparatus: Nano Viewer (manufactured by Rigaku)
X-ray source: Cu-Kα
Output: 45 kV–60 mA
Effective focal spot: 0.3 mmΦ+Confocal Max-Flux Mirror
$1^{st}$ Slit: 0.5 mm, $2^{nd}$ Slit: 0.4 mm, $3^{rd}$ Slit: 0.8 mm
Irradiation time: 40 min (deep-color ink), 240 min (light-color ink)
Beam stopper: 3.0 mmΦ
Measurement method: Penetration method
Detector: Blue Imaging Plate A peak area obtained by removing a background and a 2θ value accounting for 75% or more of the entire peak area ($2θ_{75}$ value) were measured from the resultant scattering angle profile by means of an X-ray diffraction data processing soft JADE (Material Data, Inc.). The $d_{75}$ value was calculated from the $2θ_{75}$ value on the basis of the following expression (2). Table 12 shows the results.

$$d_{75} = \lambda/2 \sin θ_{75} \quad \text{Eq. (2)}$$

(4) Measurement of Maximum Absorption Wavelength (λmax)

After each of the resultant deep-color and the light-color inks had been diluted 2,000 times with pure water, the maximum absorption wavelength (λmax) was measured. Table 12 shows the results. The maximum absorption wavelength (λmax) was measured under the following conditions.

Spectrophotometer: Self-recording spectrophotometer (trade name: U-3300; manufactured by Hitachi, Ltd.)
Measurement cell: 1 cm quartz cell
Sampling interval: 0.1 nm
Scanning rate: 30 nm/min Number of measurements: Measurement was performed five times to take the average value of the five measurements.

(5) Creation of Recorded Article

Each of the deep-color and light-color inks thus prepared was mounted on an ink jet recording apparatus (trade name: Pixus 950i; manufactured by CANON Inc.) to print a gradation pattern, in which the deep-color and light-color inks were superimposed on each other, on an ink jet glossy medium (trade name: PR101; manufactured by CANON Inc.) by changing a printing duty to 5, 12, 21, 29, 35, 43, 51, 58, 66, 74, 85, 90, and 100%. Thus, a recorded article was created.

(6) Evaluation of Bronze Resistance

The gradation pattern of the recorded article thus created was evaluated for bronze resistance. The evaluation method and the like are the same as those described above. Table 12 shows the results of the evaluation.

(7) Evaluation of Environmental Gas Resistance

The recorded article thus created was placed in an ozone test apparatus (trade name: OMS-H; manufactured by SUGA TEST INSTRUMENTS) to perform ozone exposure in an environment having a temperature of 40° C., a humidity of 55%, and an ozone gas concentration of 2 ppm for 20 hours. A remaining density ratio was calculated on the basis of the following expression (3) from the reflection densities at a superimposed portion with a deep-color ink printing duty of 51% and a light-color ink printing duty of 51% of the recorded article before and after the exposure test. The evaluation criteria for the environmental gas resistance are as follows. Table 12 shows the results of the evaluation.

$$\text{Remaining density ratio} = (d_{O3}/d_{ini}) \times 100 \, (\%) \quad \text{Eq. (3)}$$

(In the expression (3), $d_{O3}$ represents the reflection density after the ozone exposure and $d_{ini}$ represents the reflection density before the ozone exposure.)

A: A remaining density ratio of 88% or more.
B: A remaining density ratio of 83% or more and less than 88%
C: A remaining density ratio of 80% or more and less than 83%.
D: A remaining density ratio of less than 80%. .

TABLE 12

|  |  | Deep-color ink | $d_{75}$ value [nm] | λ max [nm] | Light-color ink | $d_{75}$ value [nm] | λ max [nm] | Bronzing resistance | Environmental gas resistance |
|---|---|---|---|---|---|---|---|---|---|
| Example | 1 | A1 | 6.90 | 613.0 | G5 | 7.52 | 611.9 | AA | A |
|  | 2 | A2 | 6.91 | 613.0 | G5 | 7.52 | 611.9 | AA | A |
|  | 3 | A3 | 6.91 | 613.0 | G5 | 7.52 | 611.9 | A | A |
|  | 4 | A4 | 6.92 | 613.0 | G5 | 7.52 | 611.9 | A | A |
|  | 5 | A1 | 6.90 | 613.0 | G6 | 7.53 | 611.9 | B | A |
|  | 6 | A1 | 6.90 | 613.0 | A5 | 6.70 | 613.0 | AA | A |
|  | 7 | A1 | 6.90 | 613.0 | J5 | 9.10 | 610.0 | AA | A |
|  | 8 | A1 | 6.90 | 613.0 | K5 | 9.11 | 609.9 | A | A |
|  | 9 | A1 | 6.90 | 613.0 | I5 | 10.60 | 608.0 | B | A |
|  | 10 | B1 | 6.70 | 614.0 | G5 | 7.52 | 611.9 | AA | A |
|  | 11 | C1 | 7.10 | 612.0 | G5 | 7.52 | 611.9 | AA | A |
|  | 12 | D1 | 6.69 | 614.1 | G5 | 7.52 | 611.9 | AA | B |
|  | 13 | E1 | 6.50 | 616.0 | G5 | 7.52 | 611.9 | AA | B |
| Comparative Example | 1 | A1 | 6.90 | 613.0 | G7 | 7.55 | 611.9 | C | A |
|  | 2 | A1 | 6.90 | 613.0 | G8 | 7.56 | 611.9 | C | A |
|  | 3 | A1 | 6.90 | 613.0 | L5 | 6.69 | 613.1 | AA | C |
|  | 4 | A1 | 6.90 | 613.0 | F5 | 4.47 | 616.1 | AA | D |
|  | 5 | A1 | 6.90 | 613.0 | M5 | 10.61 | 607.9 | C | A |
|  | 6 | A1 | 6.90 | 613.0 | N5 | 14.38 | 603.0 | D | A |
|  | 7 | F1 | 6.49 | 616.1 | G5 | 7.52 | 611.9 | AA | C |
|  | 8 | H1 | 6.43 | 618.0 | G5 | 7.52 | 611.9 | AA | D |
|  | 9 | G1 | 7.11 | 611.9 | G5 | 7.52 | 611.9 | C | A |
|  | 10 | I1 | 7.44 | 608.0 | G5 | 7.52 | 611.9 | D | A |

The foregoing has confirmed the following. On condition that a coloring material as a compound represented by the general formula (I) or a salt thereof in the present invention is used, environmental gas resistance may be insufficient when deep-color ink has a $d_{75}$ value of less than 6.50 nm or light-color ink has a $d_{75}$ value of less than 6.70 nm, and bronze resistance may be insufficient when the deep-color ink has a $d_{75}$ value in excess of 7.10 nm or the light-color ink has a $d_{75}$ value in excess of 10.60 nm. The foregoing has also confirmed that bronze resistance may be insufficient when the content (mass %) of 2-pyrrolidone in the light-color ink is less than 50.0% with respect to the content (mass %) of the coloring material. The foregoing has also confirmed that excellent bronze resistance can be obtained when the content (mass %) of 2-pyrrolidone in the deep-color ink is 50.0% or more with respect to the content (mass %) of the coloring material.

This application claims priority from Japanese Patent Application No. 2004-221832 filed on Jul. 29, 2004 and Japanese Patent Application No. 2005-216232 filed on Jul. 26, 2005 hereby incorporated by reference herein.

What is claimed is:

1. An ink jet light-color ink to be used in combination with an ink jet deep-color ink having a relatively large coloring material content, the ink jet light-color ink comprising at least water, a water-soluble organic solvent and a coloring material, wherein
   the ink jet deep-color ink satisfies the following conditions (1) and (2); and
   the ink jet light-color ink satisfies the following conditions (3) to (5);

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

(2) In a dispersion distance distribution, measured by a small-angle X-ray scattering method, of molecular aggregates in the deep-color ink whose coloring material concentration is adjusted to 3.0 mass %, a dispersion distance $d_{75}$ value corresponding to 75% of the distribution is 6.50 nm or more and 7.10 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) In a dispersion distance distribution, measured by a small-angle X-ray scattering method, of molecular aggregates in the light-color ink whose coloring material concentration is adjusted to 0.5 mass %, a dispersion distance $d_{75}$ value corresponding to 75% of the distribution is 6.70 nm or more and 10.60 nm or less;

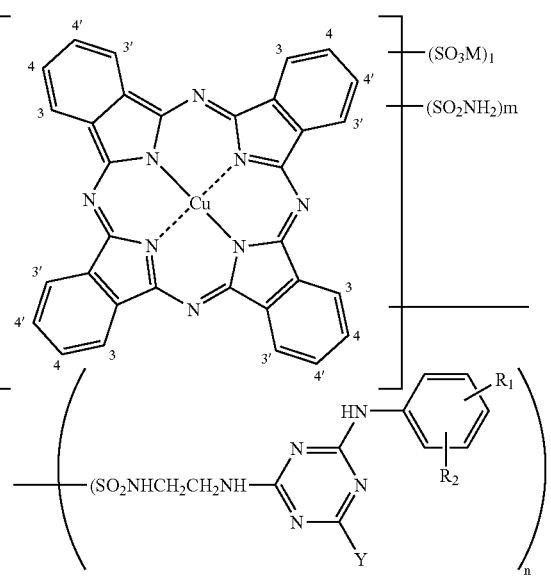

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3 (provided that 1+m+n=3 to 4; and positions at which substituents are present are 4- or 4'-positions.

2. The ink jet light-color ink according to claim 1, wherein the coloring material comprises a compound represented by the following general formula (II) or a salt thereof:

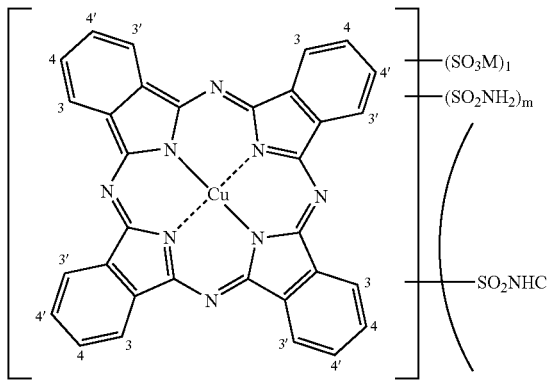

wherein M represents an alkali metal or ammonium; l represents 0 to 2, m represents 1 to 3, and n represents 1 to 3 provided that 1+m+n=3 to 4; and positions at which substituents are present are the 4- or 4'-positions.

3. The ink jet light-color ink according to claim 1, wherein the coloring material contains at least the compound in which $l \geq 1$.

4. The ink jet light-color ink according to claim 1, wherein the $d_{75}$ value of the ink jet light-color ink is 9.10 nm or less.

5. The ink jet light-color ink according to claim 1, wherein the $d_{75}$ value of the ink jet deep-color ink is 6.70 nm or more.

6. An ink jet light-color ink to be used in combination with an ink jet deep-color ink having a relatively large coloring material content, the ink jet light-color ink comprising at least water, a water-soluble organic solvent and a coloring material, wherein the ink jet deep-color ink satisfies the following conditions (1) and (2); and the ink jet light-color ink satisfies the following conditions (3) to (5);

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

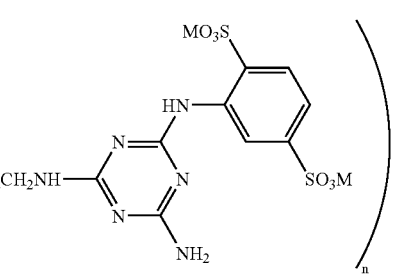

(2) A maximum absorption wavelength (λmax) obtained by measuring an absorbance of deep-color ink prepared by diluting 2,000 times the ink jet deep-color ink is 612.0 nm or more and 616.0 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) A maximum absorption wavelength (λmax) obtained by measuring an absorbance of light-color ink prepared by diluting 2,000 times the ink jet light-color ink is 608.0 nm or more and 613.0 nm or less;

General formula (I):

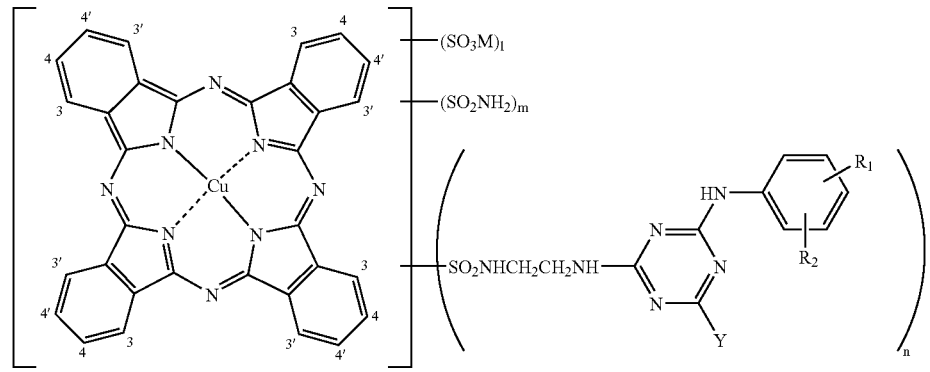

wherein M represents an alkali metal or ammonium; $R_1$ and $R_2$ each independently represent a hydrogen atom, a sulfonic group, or a carboxyl group provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3 provided that l+m+n=3 to 4; and positions at which substituents are present are 4- or 4'-positions.

7. The ink jet light-color ink according to claim 6, wherein the coloring material comprises a compound represented by the following general formula (II) or a salt thereof:

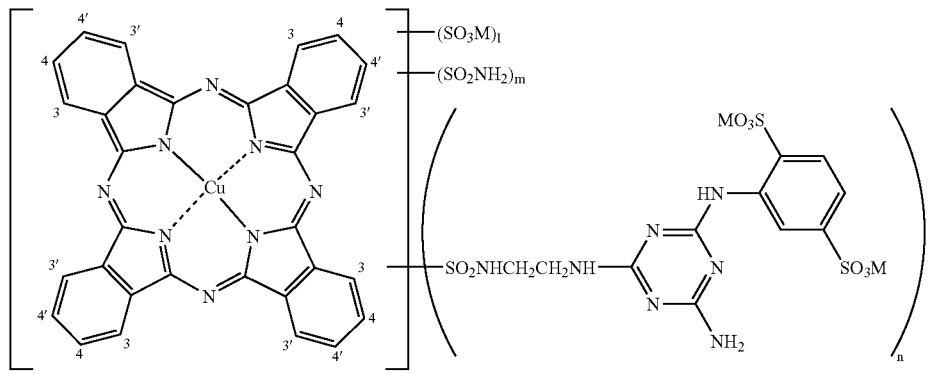

wherein M represents an alkali metal or ammonium; l represents 0 to 2, m represents 1 to 3, and n represents 1 to 3 provided that l+m+n=3 to 4; and positions at which substituents are present are 4- or 4'-positions.

8. The ink jet light-color ink according to claim 6, wherein the coloring material contains at least the compound in which $l \geq 1$.

9. The ink jet light-color ink according to claim 6, wherein the maximum absorption wavelength (λmax) of the ink jet light-color ink is 610.0 nm or more and 613.0 nm or less.

10. An ink jet light-color ink to be used in combination with an ink jet deep-color ink having a relatively large coloring material content, the ink jet light-color ink comprising at least water, a water-soluble organic solvent and a coloring material, wherein the ink jet deep-color ink satisfies the following conditions (1) and (2); and the ink jet light-color ink satisfies the following conditions (3) to (5);

(Conditions)

(1) The ink jet deep-color ink comprises at least a compound represented by the following general formula (I) or a salt thereof as a coloring material, and a content (mass %) of the coloring material is 3.0 mass % or more with respect to a total mass of the ink jet deep-color ink;

(2) A maximum absorption wavelength (λmax) obtained by measuring an absorbance of deep-color ink prepared by diluting 2,000 times the ink jet deep-color ink is 612.0 nm or more and 614.0 nm or less;

(3) The coloring material comprises a compound represented by the following general formula (I) or a salt thereof, and a content (mass %) of the coloring material is 0.5 mass % or more and less than 3.0 mass % with respect to a total mass of the ink jet light-color ink;

(4) A content (mass %) of 2-pyrrolidone in the water-soluble organic solvent is 50.0% or more with respect to the content (mass %) of the coloring material;

(5) A maximum absorption wavelength (λmax) obtained by measuring an absorbance of light-color ink prepared by diluting 2,000 times the ink jet light-color ink is 608.0 nm or more and 613.0 nm or less;

General formula (I):

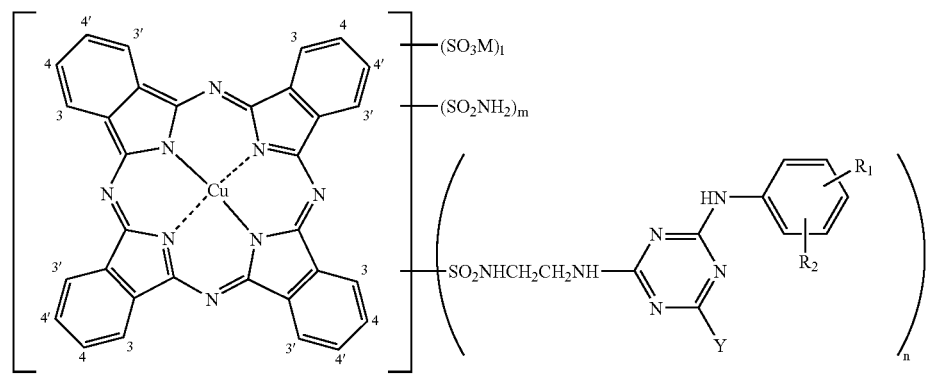

wherein M represents an alkali metal or ammonium; $R_1$ and $R_2$ each independently represent a hydrogen atom, a sulfonic group, or a carboxyl group provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3 provided that 1+m+n=3 to 4; and positions at which substituents are present are 4- or 4'-positions.

11. An ink jet light-color ink to be used in combination with an ink jet deep-color ink having a relatively large coloring material content, the ink jet light-color ink comprising water, a water-soluble organic solvent and a coloring material, wherein
the ink jet deep-color ink satisfies the following conditions (1) to (3); and
the ink jet light-color ink satisfies the following conditions (4) to (6);
(Conditions)
(1) The ink jet deep-color ink comprises at least water, a water-soluble organic solvent, and a compound represented by the following general formula (I) or a salt thereof as a coloring material, and a content (mass %) of the coloring material is 3.0 mass % or more with respect to a total mass of the ink jet deep-color ink;
(2) A content (mass %) of 2-pyrrolidone in the water-soluble organic solvent is 50.0% or more with respect to the content (mass %) of the coloring material;
(3) A maximum absorption wavelength (λmax) obtained by measuring an absorbance of deep-color ink prepared by diluting 2,000 times the ink jet deep-color ink is 612.0 nm or more and 616.0 nm or less;
(4) The coloring material comprises a compound represented by the following general formula (I) or a salt thereof, and a content (mass %) of the coloring material is 0.5 mass % or more and less than 3.0 mass % with respect to a total mass of the ink jet light-color ink;
(5) A content (mass %) of 2-pyrrolidone in the water-soluble organic solvent is 50.0% or more with respect to the content (mass %) of the coloring material;
(6) A maximum absorption wavelength (λmax) obtained by measuring an absorbance of light-color ink prepared by diluting 2,000 times the ink jet light-color ink is 608.0 nm or more and 613.0 nm or less;

atom, a hydroxyl group, an amino group, or a monoalkylamino or dialkylamino group; l represents 0 to 2, m represents 1 to 3, and n represents 1 to 3 provided that 1+m+n=3 to 4; and positions at which substituents are present are 4- or 4'-positions.

12. An ink set including multiple inks, comprising the ink jet light-color ink according to claim 1 and the ink jet deep-color ink according to claim 1.

13. An ink jet recording method, comprising ejecting an ink by an ink jet method to perform recording on a recording medium, wherein the ink comprises the ink jet light-color ink according to claim 1.

14. An ink cartridge, comprising an ink storage portion for storing ink, wherein the ink comprises the ink jet light-color ink according to claim 1.

15. A recording unit, comprising an ink storage portion for storing ink and a recording head for ejecting the ink, wherein the ink comprises the ink jet light-color ink according to claim 1.

16. An ink jet recording apparatus, comprising an ink storage portion for storing ink and a recording head for ejecting the ink, wherein the ink comprises the ink jet light-color ink according to claim 1.

17. An ink jet recording method, comprising ejecting an ink by an ink jet method to perform recording on a recording medium, wherein the ink comprises the ink jet light-color ink according to claim 6.

18. An ink cartridge, comprising an ink storage portion for storing ink, wherein the ink comprises the ink jet light-color ink according to claim 6.

19. A recording unit, comprising an ink storage portion for storing ink and a recording head for ejecting the ink, wherein the ink comprises the ink jet light-color ink according to claim 6.

20. An ink jet recording apparatus, comprising an ink storage portion for storing ink and a recording head for ejecting the ink, wherein the ink comprises the ink jet light-color ink according to claim 6.

General formula (I):

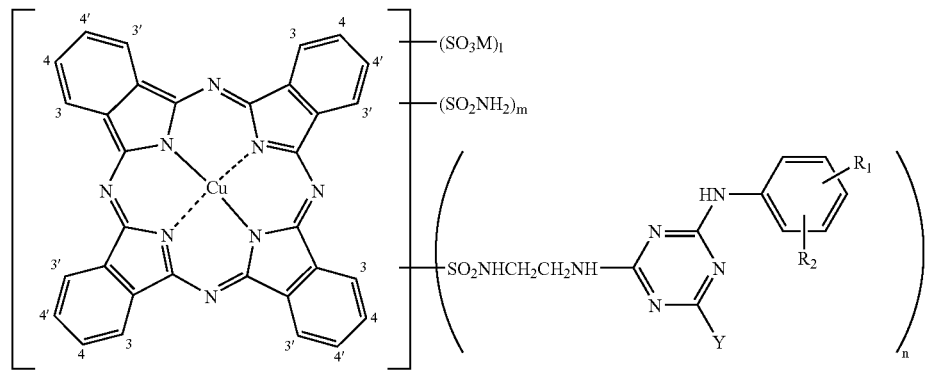

wherein M represents an alkali metal or ammonium; $R_1$ and $R_2$ each independently represent a hydrogen atom, a sulfonic group, or a carboxyl group provided that $R_1$ and $R_2$ are not simultaneously a hydrogen atom; Y represents a chlorine

* * * * *

UNITED STATES PATENT AND TRADEMARK OFFICE
CERTIFICATE OF CORRECTION

PATENT NO. : 7,201,791 B2
APPLICATION NO. : 11/339640
DATED : April 10, 2007
INVENTOR(S) : Daiji Okamura et al.

It is certified that error appears in the above-identified patent and that said Letters Patent is hereby corrected as shown below:

COLUMN 1

Line 3, "ah" should read --an--.

COLUMN 19

Line 34, "50" should read --5°--.

COLUMN 21

Line 29, "been also" should read --also been--.

Line 37, "been also" should read --also been--.

COLUMN 26

Line 52, "use" should read --used--.

COLUMN 36

Line 32, "and" should read -->--.

Line 48, "membrane" should read --membrane.--.

COLUMN 37

Line 25, "(Content" should read --{Content--.

Line 25, "material)" should read --material}--.

Line 54, "$d_{75}$ = /2 sin $\theta_{75}$" should read --$d_{75} = \lambda/2 \sin \theta_{75}$--.

UNITED STATES PATENT AND TRADEMARK OFFICE
CERTIFICATE OF CORRECTION

PATENT NO. : 7,201,791 B2
APPLICATION NO. : 11/339640
DATED : April 10, 2007
INVENTOR(S) : Daiji Okamura et al.

It is certified that error appears in the above-identified patent and that said Letters Patent is hereby corrected as shown below:

COLUMN 40

Line 34, "material;" should read --material; and--.

Line 40, "less;" should read --less;
    General formula (I):--.

Line 66, "(provided" should read --provided--.

COLUMN 41

Line 3, "(provided" should read --provided--.

COLUMN 42

Line 41, "material;" should read --material; and--.

COLUMN 44

Line 42, "material;" should read --material; and--.

COLUMN 45

Line 38, "material;" should read --material; and--.

UNITED STATES PATENT AND TRADEMARK OFFICE
CERTIFICATE OF CORRECTION

| | |
|---|---|
| PATENT NO. | : 7,201,791 B2 |
| APPLICATION NO. | : 11/339640 |
| DATED | : April 10, 2007 |
| INVENTOR(S) | : Daiji Okamura et al. |

It is certified that error appears in the above-identified patent and that said Letters Patent is hereby corrected as shown below:

<u>COLUMN 46</u>

Line 19, "forejecting" should read --for ejecting--.

Signed and Sealed this

Twentieth Day of May, 2008

JON W. DUDAS
*Director of the United States Patent and Trademark Office*